United States Patent [19]

Yamada et al.

[11] Patent Number: 5,565,995
[45] Date of Patent: Oct. 15, 1996

[54] SYSTEM FOR CORRECTING A PULSE-WIDTH-MODULATED SIGNAL IN A RECORDING APPARATUS

[75] Inventors: Hiromichi Yamada; Masaharu Ohkubo; Masaki Ojima; Hiroshi Sasame; Takashi Kawana; Kaoru Seto, all of Yokohama; Hiroshi Mano, Tokyo; Tetsuo Saito, Tokyo; Atsushi Kashihara, Tokyo; Michio Ito, Tokyo, all of Japan

[73] Assignee: Canon Kabushiki Kaisha, Tokyo, Japan

[21] Appl. No.: 434,847

[22] Filed: May 4, 1995

Related U.S. Application Data

[62] Division of Ser. No. 71,340, Jun. 2, 1993, Pat. No. 5,463,473, which is a continuation of Ser. No. 606,472, Oct. 30, 1990, abandoned.

[30] Foreign Application Priority Data

Oct. 31, 1989 [JP] Japan ................................. 1-282017
Dec. 4, 1989 [JP] Japan ................................. 1-313387
Jan. 12, 1990 [JP] Japan ................................. 2-003488

[51] Int. Cl.$^6$ .......................... H04N 1/40; H04N 1/29; G03G 21/00; G01D 15/14
[52] U.S. Cl. ..................... 358/298; 358/300; 355/208; 355/246; 347/131; 347/133
[58] Field of Search ........................ 358/296, 298, 358/300, 406, 456, 462, 504, 534; 355/208, 246; 347/129–133, 225, 251–254

[56] References Cited

U.S. PATENT DOCUMENTS

| | | | |
|---|---|---|---|
| 4,308,326 | 12/1981 | Wirth | 358/298 X |
| 4,547,811 | 10/1985 | Ochi | 358/280 |
| 4,547,812 | 10/1985 | Waller | 358/298 X |
| 4,680,646 | 7/1987 | Ikeda | 358/298 |
| 4,709,250 | 11/1987 | Takeuchi | 346/160 |
| 4,864,419 | 9/1989 | Saito | 358/300 |
| 4,872,035 | 10/1989 | Miyake | 355/208 |
| 4,873,428 | 10/1989 | Takeuchi | 250/214 |
| 4,914,459 | 4/1990 | Mama | 346/160 |
| 4,930,007 | 5/1990 | Sugiura | 358/75 |
| 4,989,039 | 1/1991 | Hayashi | 355/208 |
| 4,999,629 | 3/1991 | Katsuta | 358/462 X |
| 5,016,118 | 5/1991 | Nannichi | 358/462 |
| 5,066,961 | 11/1991 | Yamashita | 346/76 PH |
| 5,189,441 | 2/1993 | Fukui | 346/160 |
| 5,241,347 | 8/1993 | Kodama | 355/246 |
| 5,250,959 | 10/1993 | Yamada et al. | 358/298 X |
| 5,274,424 | 12/1993 | Hattori et al. | 355/208 |
| 5,305,057 | 4/1994 | Hattori et al. | 355/208 X |
| 5,313,308 | 5/1994 | Hasegawa | 358/406 |
| 5,424,809 | 6/1995 | Sawayama et al. | 355/208 |

FOREIGN PATENT DOCUMENTS

| | | |
|---|---|---|
| 269033 | 6/1988 | European Pat. Off. . |
| 276107 | 7/1988 | European Pat. Off. . |
| 338726 | 10/1989 | European Pat. Off. . |
| 3605320 | 8/1986 | Germany . |
| 60-260072 | 12/1985 | Japan . |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image forming device suitable for use in a laser beam printer includes an image forming unit for forming an image on a photoconductor, and a reproduction unit for reproducing a high density image and a halftone image on the photoconductor. A detector then detects the density of the high density image and the halftone image formed on the photoconductor. A controller controls an image forming condition of the image forming unit based on a detection result by the detector.

24 Claims, 28 Drawing Sheets

| 7 | 8 | 9 | 10 |
| --- | --- | --- | --- |
| 6 | 1 | 2 | 11 |
| 5 | 4 | 3 | 12 |
| 16 | 15 | 14 | 13 |

SYSTEM FOR CORRECTING A PULSE-WIDTH-MODULATED SIGNAL IN A RECORDING APPARATUS

This application is a division of application Ser. No. 08/071,340 filed Jun. 2, 1993 now U.S. Pat. No. 5,463,473, which is a continuation of application Ser. No. 07/606,472 filed Oct. 30, 1990, now abandoned.

BACKGROUND OF THE INVENTION

1. Field of the Invention

This invention relates to an image forming apparatus, and more specifically relates to an image forming apparatus which can reproduce a halftone image with high quality.

2. Description of the Related Art

Known non-impact printers referred to as light beam printers are coming into wide use because these printers have a high resolution and are quiet. In such known recording apparatuses, methods generally referred to as the dither method, the error dispersion method and the pulse-width-modulated method are adopted for reproducing halftone images.

In order to reproduce a faithful halftone density by utilizing a density level signal input to the recording apparatus, the printer characteristic, the so-called gamma ($\gamma$) characteristic (ideal value: $\gamma=1$) is corrected. That is, various controls are performed for making the relation between the input density level signal and the density level of a reproduced halftone image linear.

However, even if a gamma correction is performed for making the relation linear by such controls, a set development characteristic of the printer may vary because of changes in environmental conditions (temperature, humidity, etc.) or an increase of the number of printed sheets, so that the linearity of the relation cannot be maintained.

Accordingly, in the known printer, it has been considered for a controller to correct the variance of the gamma characteristic caused by the variance of environment conditions by changing a gamma conversion table, such as a dither table, for reproducing a halftone image.

However, if such changing of the gamma conversion table is performed by the controller by predicting the change in printing density based on a parameter using environment conditions or the number of printed sheets, an error in gamma correction may be big.

Meanwhile, in the case where the printer receives a modulated signal and turns on/off an image exposure device according to the modulated signal, the potential number of different gamma conversion tables may be increased remarkably, because each printer has different development characteristics.

Further, in the case where a photoconductor, a charger, developing device, and a cleaning device, etc., are detachable relative to the main body of the recording apparatus, that is, a so-called process cartridge, the individual difference of the process cartridge must be considered.

Accordingly, a large-capacity memory is required as the gamma conversion table because the number of different gamma conversion tables is increased, which increases the cost of the apparatus.

When such known electrophotographic image forming apparatus is used for a long time, the sensitivity characteristic of a photoconductor drum is deteriorated, whereby the whole output image is brightened, or a thin portion or a solid portion cannot be reproduced faithfully. Even if the apparatus is not used for a long time, the quality of the output image is deteriorated because of the variance of environment conditions or the dispersion of electrostatic charge, a photosensitive drum, a developing device, or image exposure amount.

In order to mitigate the above described problems, it has been proposed to control the surface electrical potential of the photosensitive drum automatically so as to obtain a uniform potential, or to control the developing bias of the developing device so as to obtain a uniform density of a solid image formed on the photosensitive drum. For example, U.S. Pat. No. 4,872,035 describes an apparatus in which primary charger control is based on solid image portions while lamp control is based bright image portions.

However, such controls are not effective in producing accurate halftone image. Even if the above-described controls are used in such apparatus, it is insufficient to obtain a stabilized image with high quality. In the case where the surface electrical potential or the solid image are controlled, there is the defect that the reproduced halftone image is varied.

A known laser beam printer capable of halftone density printing is structured in such a way that it inputs pulse-width-modulated image data, corresponding to each density, sent from a host computer, and carries out the halftone density printing based on the input image data.

Explanations of an operation for the halftone density printing will be described below with reference to FIG. 29 and FIG. 30.

FIG. 29 is a block diagram showing an arrangement of a known image forming apparatus.

FIG. 30 is a timing chart for signals between a host computer and a printer.

When a command signal, such as a signal for setting printing conditions, output from a host computer 91 shown in FIG. 29 is transmitted on a command/status signal line 93, a printer 92 transmits a reply complying with the command signal as a status signal. Then, the host computer 91 judges the status signal, and transmits a video signal 94 representing image data and a video clock signal 95 representing an image clock to the printer 92 when the status signal instructs the host computer 91 that printer 92 is ready to print.

A semiconductor laser 99 in the printer 92 emits a laser beam when a laser driver 98 is driven in accordance with the video signal 94. The laser beam is irradiated to form an electrostatic latent image on a photosensitive drum by a polygonal mirror (not shown). Then, a toner adheres to the electrostatic latent image, and a visualized toner image is transferred to a fed printing sheet. And then, printing is completed by fixing the transferred toner image.

FIG. 30 shows a timing chart for the signals 94, 95 described above.

As described above, the video signal 94, which is pulse-width-modulated in the host computer 91 so as to represent an image density with its pulse-width, is transmitted to the printer 92 in synchronism with a rising edge of the video clock signal 95. The printer 92 drives the laser driver 98 according to the pulse-width of the video signal 94 so as to execute the halftone density printing. That is, the halftone density printing is performed by controlling an irradiation time of the semiconductor laser 99. In the case where the pulse-width of the video signal 94 is long, the printing density is darkened. Meanwhile, in the case where the pulse-width of the video signal is short, the printing density is brightened.

However, the known image forming apparatus has the following defects.

For example, a 300 DPI (printing density of 300 dots per one inch) printer uses video clock signals having an approximate frequency of 2 MHz, which represents a period of 500 ns. In the case where the printer prints halftone density having sixteen gradations, it is required to have an ability to divide one dot into sixteen elements.

Thus, pulse signals having a period of 31.25 ns (500 ns÷16=31.25 ns) are transmitted as video signals to the printer from a host computer through a cable.

Accordingly, when a thin cable is used to transmit the pulse signals, there is a defect that the pulse-width of the video signals varies according to various conditions, such as, kind or length of the cable, temperature or humidity surrounding the printer, or dispersion of electronic parts of the printer. Thus, the printing density cannot be stabilized.

SUMMARY OF THE INVENTION

Accordingly, an object of the present invention is to provide an image forming apparatus that can overcome the problems described above.

Another object of the present invention is to provide an image forming apparatus that permits reproduction of images with high quality.

Still another object of the present invention is to provide an image forming apparatus that can provide, with a simple arrangement, a superior quality halftone image.

Another object of the present invention is to provide an image forming apparatus that permits reproduction of images with high quality at high speed.

It is still another object of the present invention to provide an image forming apparatus that forms a superior quality image without being affected by a change of environmental conditions.

Still another object of the present invention is to provide an image forming apparatus capable of preventing deterioration of an image.

It is still another object of the present invention to provide an image forming apparatus having a good cost performance.

It is still another object of the present invention to provide an image forming apparatus that can reproduce a faithful halftone image with less memory capacity.

Still another object of the present invention is to provide an image forming apparatus capable of forming a high quality image having halftone stability at all times.

It is still another object of the present invention to provide an image forming apparatus that can change a pulse-width of image information so as to correct an image density.

In accordance with one aspect of the invention, the image forming apparatus includes an image forming unit for forming an image on an image bearing member. A reproduction unit reproduces a high density image and a halftone image on the image bearing member. A detector then detects the density of the high density image and the halftone image formed on the image bearing member. A controller controls an image forming condition of the image forming unit based on a detection result by the detector.

In accordance with another aspect of the present invention, the image forming apparatus includes an image forming unit for forming an image on an image bearing member. A pattern generator generates a predetermined pattern. The image forming unit then forms a halftone image based on the predetermined pattern generated by the pattern generator. A detector detects the density of the halftone image. An adjuster then adjusts the image forming unit based on a detection result by the detector.

In accordance with still another aspect of the invention, the image forming apparatus includes an input circuit for inputting a pulse-width-modulated signal sent from an external host device. A correction circuit corrects the pulse-width of the pulse-width-modulated signal input from the input circuit. A recorder then records an image in accordance with the pulse-width-modulated signal corrected by the correction circuit.

Other objects, features and advantages of the invention will become apparent from the following detailed description of the preferred embodiments of the present invention and the accompanying drawings.

DETAILED DESCRIPTION OF THE PREFERRED EMBODIMENT

Embodiments of the present invention will be described in detail herein with reference to the accompanying drawings.

EMBODIMENT 1

Figure 1:
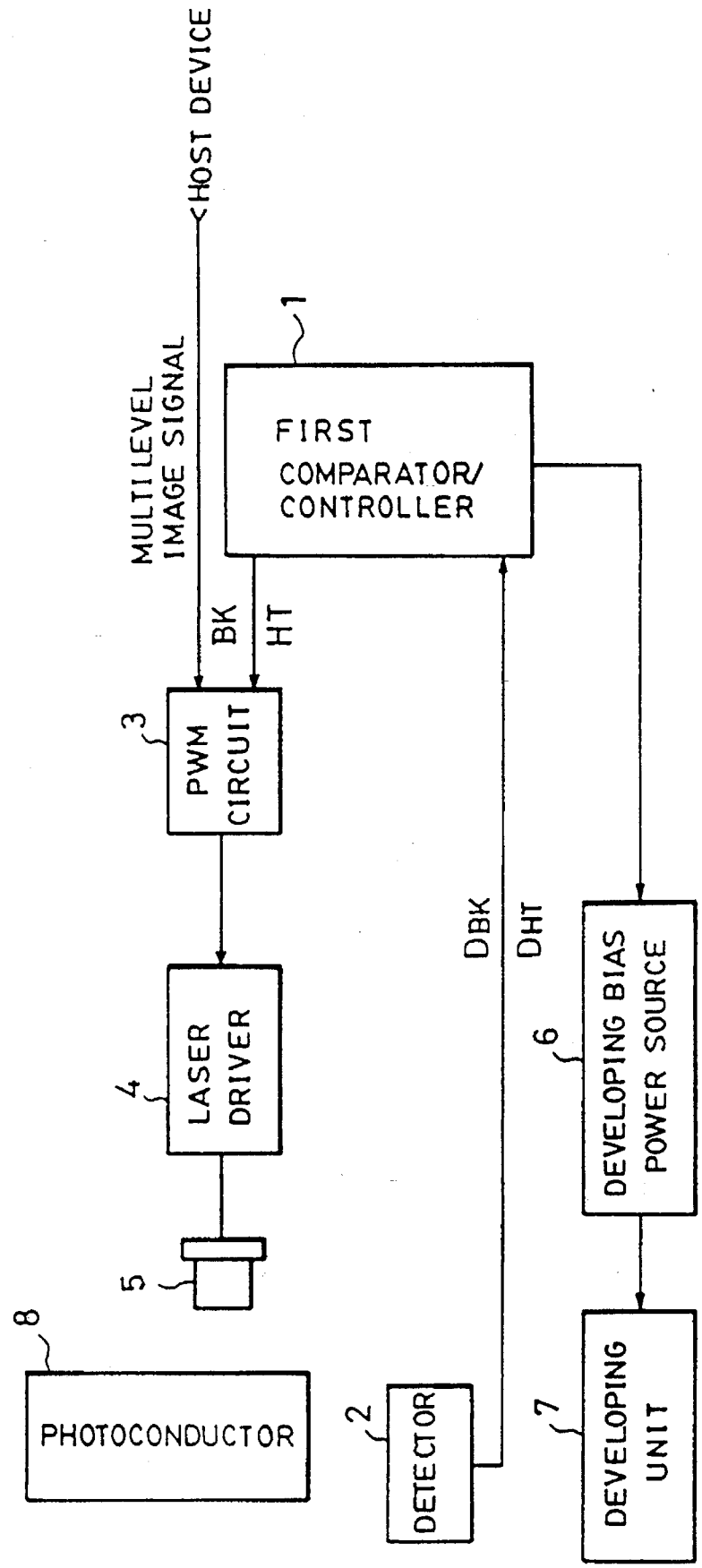
FIG. 1 is a block diagram showing an arrangement of a recording apparatus according to a first embodiment of the present invention.

FIG. 1 is a block diagram showing an arrangement of a recording apparatus according to the first embodiment of the present invention. The apparatus shown in FIG. 1 includes a comparator/controller 1 for outputting a solid image signal BK (e.g., FFH level in this case, where H indicates a hexadecimal number) and a halftone image signal HT (e.g., COH level in this case) to a PWM (pulse-width-modulated) circuit 3. The PWM circuit 3 modulates a drive pulse-width applied to a laser driver 4 based on the solid image signal BK, the halftone image signal HT, or a multi-level image signal output from a host device (not shown) so as to control an emitting time of a laser 5 within a one pixel.

The apparatus also includes a photoconductor 8 on which a latent image is formed by a light beam irradiated from the laser 5 through a scanning unit (not shown), such as a polygonal mirror, a Fθ lens, a reflection mirror, whereby a solid image, a predetermined halftone image, and a multi-level image are reproduced by a developing unit 7.

A detector 2 is provided for detecting a reflection density of the image reproduced on the photoconductor 8, and for outputting a density signal $D_{BK}$ corresponding to the solid image and a density signal $D_{HT}$ corresponding to the predetermined halftone image to the comparator/controller 1. The comparator/controller 1 obtains a density ratio between the density signal $D_{HT}$ and the density signal $D_{BK}$, compares the density ratio with a value C set in advance to obtain a difference $|(D_{HT}/D_{BK})-C|$, and executes a control to make the difference "0". The comparator/controller 1 controls a developing bias power source 6 by which a developing bias applied to the developing unit 7 is determined.

When a high density image (e.g., the solid image in this case) and the predetermined halftone image (e.g., a halftone image having a specific gray level) are reproduced on the photoconductor 8 by a reproduction means structured with the laser 5, the developing unit 7 and so forth, the detector 2 detects each density of the high density image and the predetermined halftone image.

Then, the comparator/controller 1 sets and controls an image forming condition while comparing a relative density ratio $(D_{HT}/D_{BK})$ of each density detected by the detector 2 with the value C set in advance, whereby the most suitable halftone image reproduction characteristic not affected by a variance of environment conditions can be obtained.

An operation of the comparator/controller 1 shown in FIG. 1 will be described below with reference to FIG. 2A and FIG. 2B.

Figure 2A:
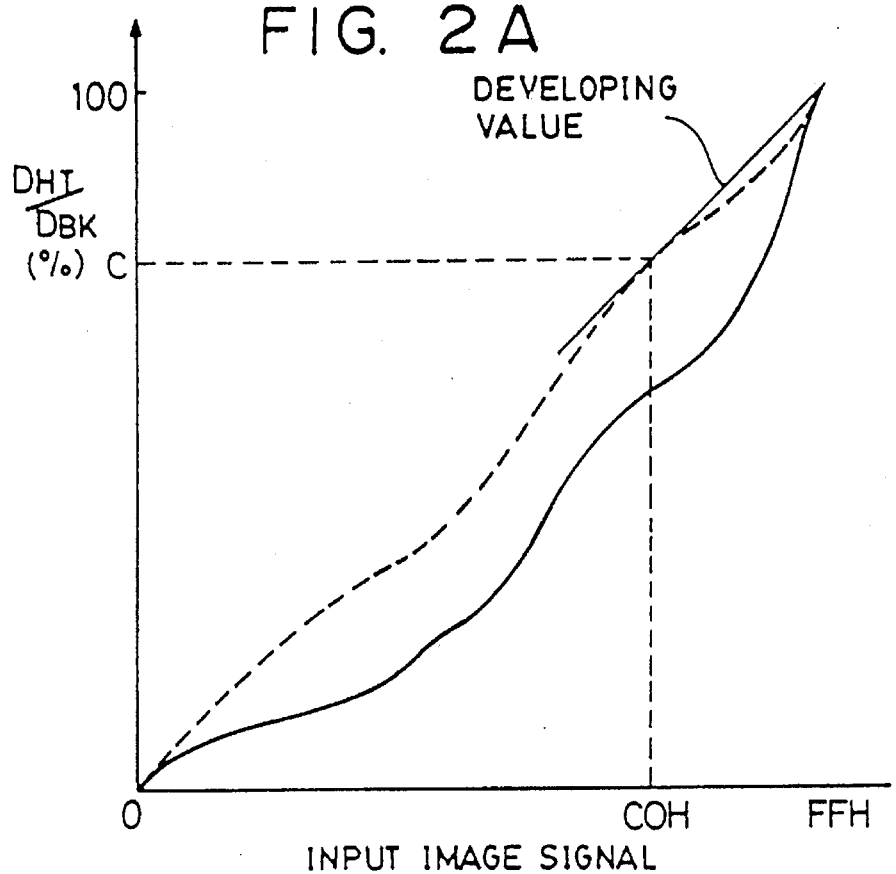
FIGS. 2A and 2B are charts for explaining improvement processing of halftone image reproduction characteristics of the recording apparatus.
Figure 2B:
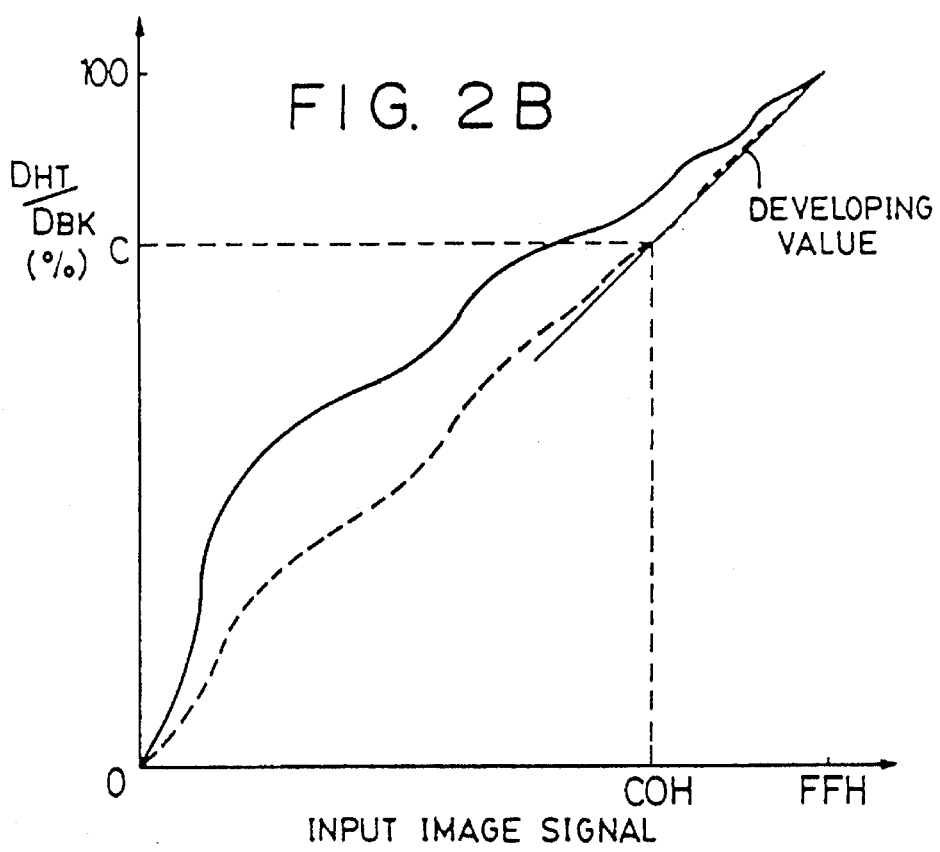

FIG. 2A and FIG. 2B are charts for explaining improvement processing of halftone image reproduction characteristics of the recording apparatus, wherein the vertical axis denotes the relative density ratio ($D_{HT}/D_{BK}$ (%)), and the horizontal axis denotes the input multi-level image signal. For example, in the case where the relative density ratio $(D_{HT}/D_{BK})$, which is obtained through the detector 2, corresponding to a predetermined input image data "COH" is smaller than the value C as shown in FIG.. 2A solid line, the comparator/controller 1 controls the developing bias power source 6 to raise the developing bias. Meanwhile, in the case where the relative density ratio $(D_{HT}/D_{BK})$ corresponding to the predetermined input image data "COH" is greater than the value C as shown in FIG. 2B solid line, the comparator/controller 1 controls the developing bias power source 6 to drop the developing bias. That is, the comparator/controller 1 controls the developing bias power source 6 in such a way that the relative density ratio $(D_{HT}/D_{BK})$ corresponding to the predetermined input image data "COH" coincide with the value C to be the final target value.

According to the above-described structure, in the case where the relative density ratio $(D_{HT}/D_{BK})$ corresponding to the predetermined input image data "COH" is smaller than the value C as shown in FIG. 2A, a halftone reproduction characteristic (before the correction) indicated by the solid curve is developed into a halftone reproduction characteristic (after the correction) indicated by a dashed curve, thereby the corrected halftone reproduction characteristic indicated by the dashed curve draws near to an ideal characteristic value limitlessly.

In view of the image reproductivity after the characteristic correction, the image tone can be improved as a whole, though the density of the whole image might be brightened.

Meanwhile, in the case where the relative density ratio $(D_{HT}/D_{BK})$ corresponding to the predetermined input image data "COH" is greater than the value C as shown in FIG. 2B, a halftone reproduction characteristic (before the correction) indicated by a solid curve is developed into a halftone reproduction characteristic (after the correction) indicated by a dashed curve, thereby the corrected halftone reproduction characteristic indicated by the dashed curve draws near to the ideal characteristic value limitlessly.

In view of the image reproductivity after the characteristic correction, the image tone can be improved as a whole, though the density of the whole image might be darkened.

EMBODIMENT 2

In the above first embodiment, this invention is applied to a system in which the halftone image signal is generated as a pulse-width-modulated signal. However, this invention can be applied to a system, e.g. a system shown in FIG. 3, in which halftone image processing is executed by utilizing a specific dither pattern.

Figure 3:
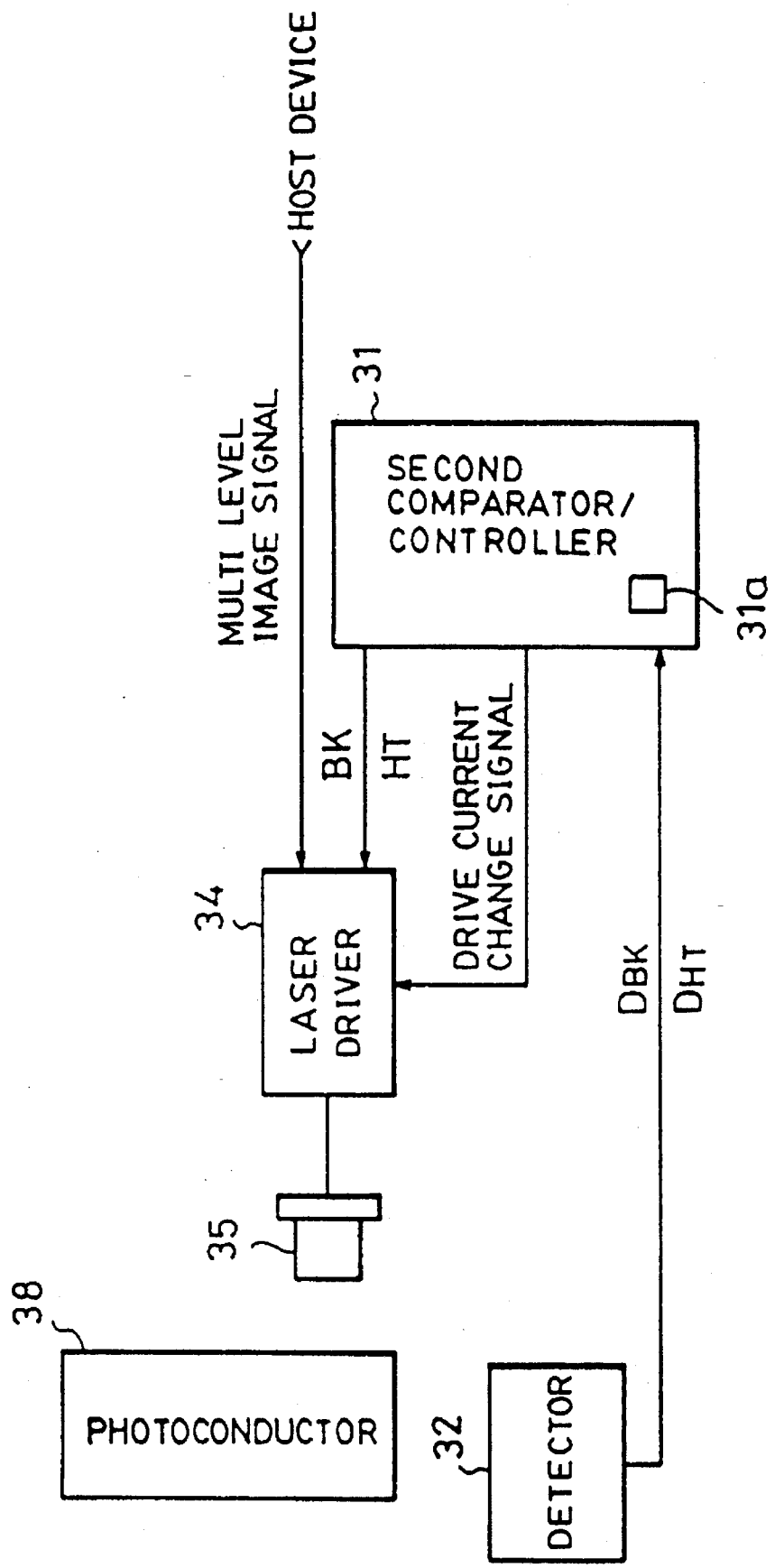
FIG. 3 is a block diagram showing an arrangement of a recording apparatus according to a second embodiment of the present invention.

FIG. 3 is a block diagram showing an arrangement of a recording apparatus according to the second embodiment of the present invention. The apparatus shown in FIG. 3 includes a comparator/controller 31 for outputting a solid image signal BK (the number of recorded dots should be n×n in the case of n×n dither matrix) and a halftone image signal HT (the number of recorded dots should be determined arbitrarily in the case of n×n dither matrix) to a laser driver 34. The laser driver 34 drives a laser 35 based on the solid image signal BK, the halftone image signal HT, or a multilevel image signal output from a host device (not shown) so as to form a halftone image on a photoconductor 38.

The apparatus includes the photoconductor 38 on which a latent image is formed by a light beam irradiated from the laser 35 through a scanning unit (not shown), such as, a polygonal mirror, a Fθ lens, a reflection mirror, whereby a solid image, a predetermined halftone image, and a multilevel image are reproduced by a developing unit (not shown).

A detector 32 is provided for detecting a reflection density of the image reproduced on the photoconductor 8, and for outputting a density signal $D_{BK}$ corresponding to the solid image and a density signal $D_{HT}$ corresponding to the predetermined halftone image to the comparator/controller 31. The comparator/controller 31 obtains the density ratio between the density signal $D_{HT}$ and the density signal $D_{BK}$, compares the density ratio with a value C set in advance to obtain a difference $|(D_{HT}/D_{BK})-C|$, and executes a control to make the difference "0". The comparator/controller 31 controls a drive current applied to the laser 35 as shown in FIG. 4.

The comparator/controller 31 includes a dither pattern unit 31a for storing dither data corresponding to an arbitrary dither pattern comprised by an n×n matrix.

Figure 4:
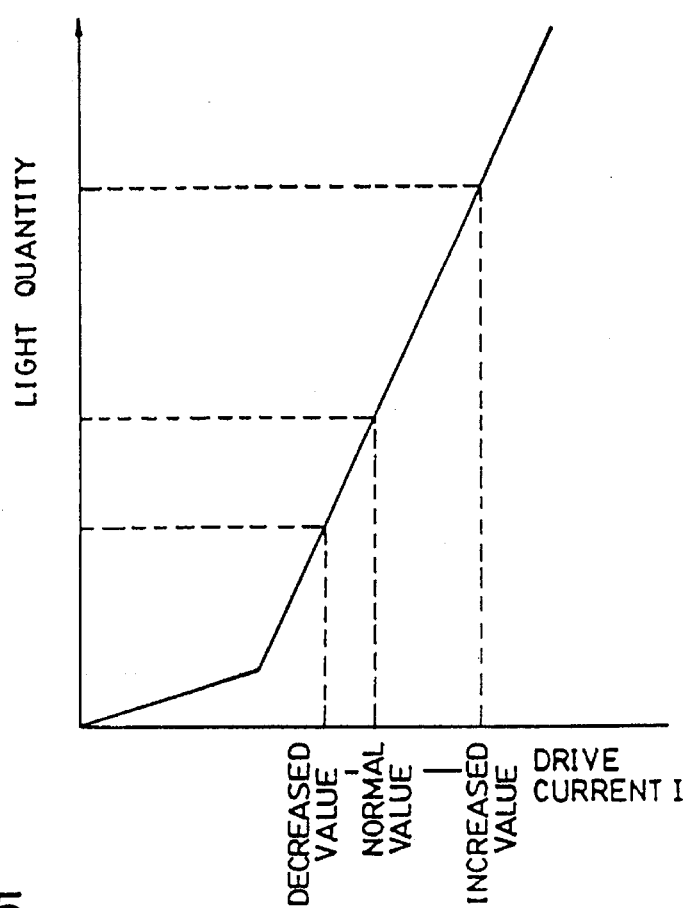
FIG. 4 is a chart showing the relation between the drive current applied to a laser shown in FIG. 3 and the light quantity.

FIG. 4 is a chart showing the relation between the drive current applied to the laser 35 shown in FIG. 3 and the light quantity, wherein the vertical axis denotes the light quantity, and the horizontal axis denotes the drive current I.

As described above, the comparator/controller 31 obtains the density ratio between the density signal $D_{HT}$ and the density signal $D_{BK}$ based on outputs from the detector 32, compares the density ratio with the value C set in advance to obtain the difference $|(D_{HT}/D_{BK})-C|$, and executes control to make the difference "0".

In the above-described embodiment, the drive current I applied to the laser 35 increases in the case where the density ratio ($D_{HK}/D_{BK}$) corresponding to a predetermined number of recorded dots is smaller than the value C. Meanwhile, in the case where the density ratio ($D_{HK}/D_{BK}$) corresponding to the predetermined number of recorded dots is greater than the value C, the drive current I decreases to decrease the light quantity emitted from the laser 35.

That is, the surface electrical potential at the exposure point on the photoconductor 38 is controlled by increasing or decreasing the light quantity, whereby the density of the visualized image formed on the photoconductor 38 is controlled.

Figure 5:
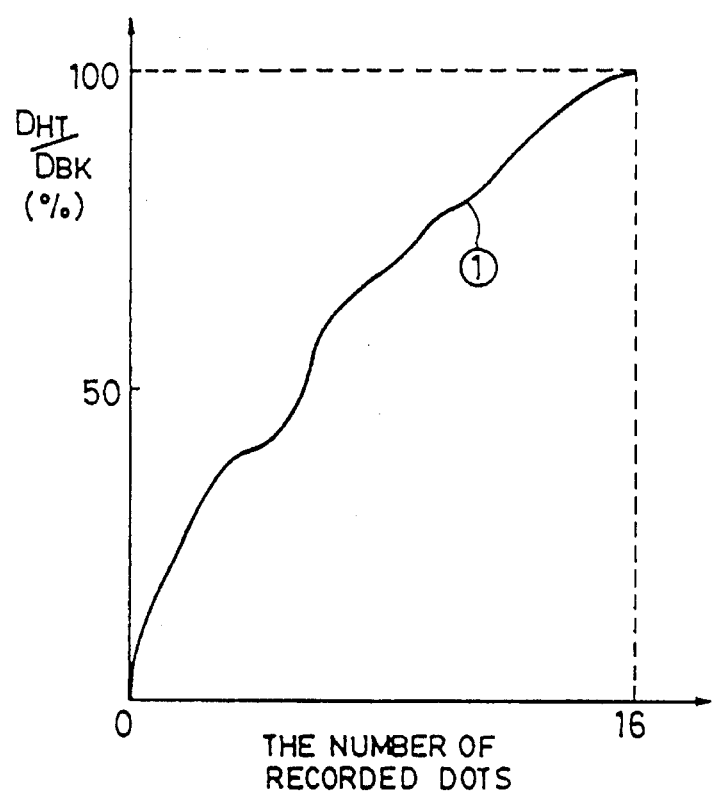
FIG. 5 is a chart showing the relation between the number of recorded dots and the density ratio in the case where a dither pattern based on the dither method is used.

FIG. 5 is a chart showing the relation between the number of recorded dots and the density ratio in the case where a dither pattern based on the dither method is used, where the horizontal axis denotes the number of recorded dots, the vertical axis denotes the density ratio ($D_{HT}/D_{BK}$), and numeral 1 denotes a reference characteristic.

Figure 6A:
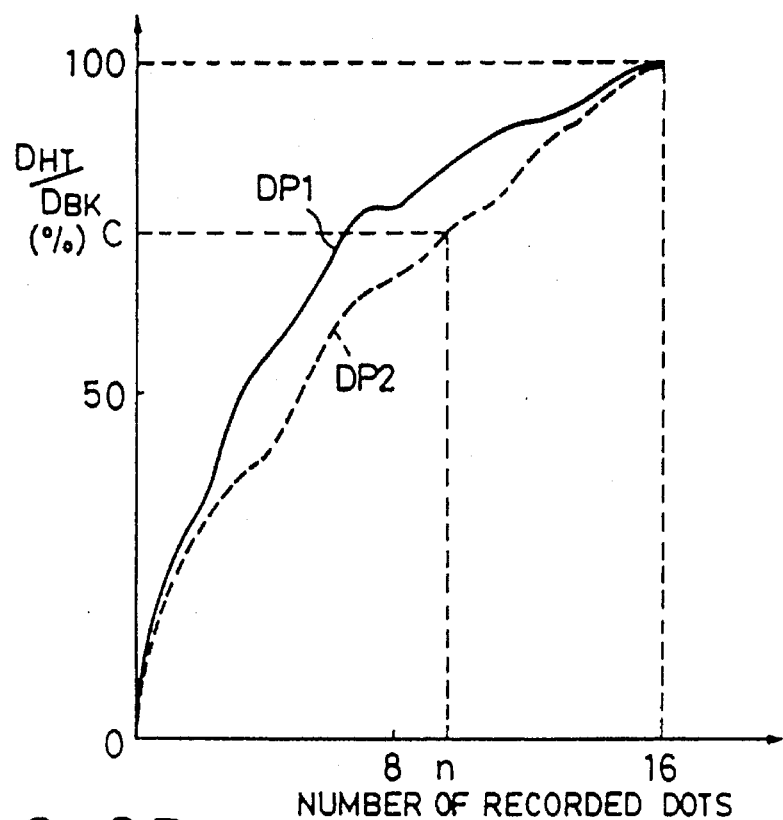
FIGS. 6A and 6B are charts showing the relations between the number of recorded dots and the density ratio, based on drive current control by the second comparator/controller 31 shown in FIG. 3.
Figure 6B:
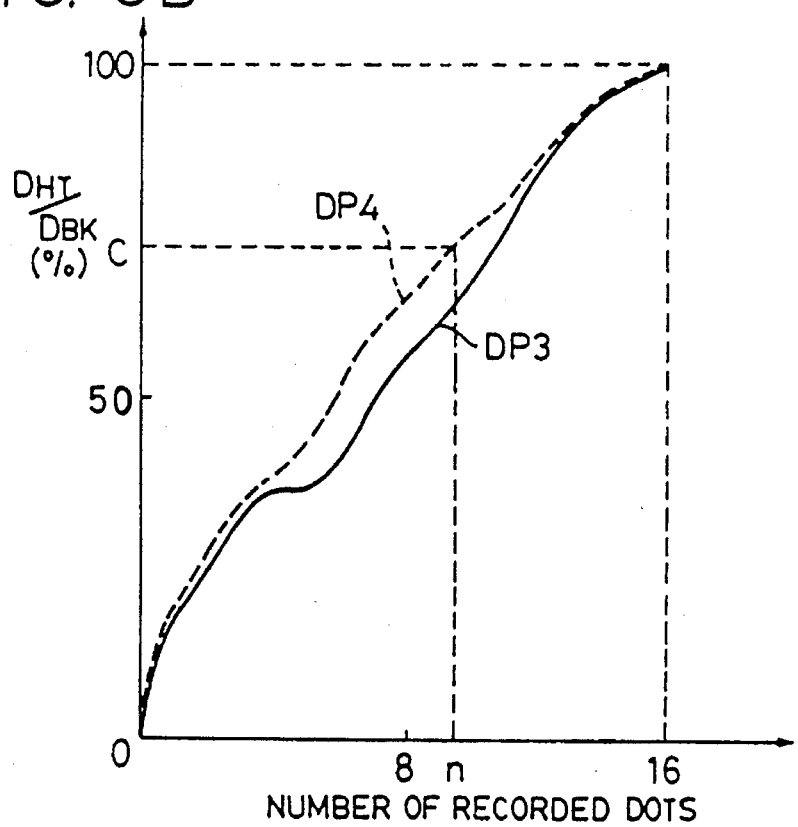

FIG. 6A and FIG. 6B are charts showing the relations between the number of recorded dots and the density ratio, based on drive current control by the comparator/controller 31 shown in FIG. 3. In FIG. 6A and FIG. 6B, the same reference numerals are used to denote the corresponding elements explained in FIG. 5. FIG. 6A shows a case where the density ratio ($D_{HT}/D_{BK}$) corresponding to the predetermined number n of recorded dots is greater than the value C. As shown in FIG. 6A, a characteristic DP1 before the correction is corrected to a characteristic DP2 indicated as a dashed line by decreasing the drive current I. The characteristic DP2 almost coincides with the reference characteristic 1 shown in FIG. 5. FIG. 6B shows a case where the density ratio ($D_{HT}/D_{BK}$) corresponding to the predetermined number n of recorded dots is smaller than the value C. As shown in FIG. 6B, a characteristic DP3 before the correction is corrected to a characteristic DP4 indicated as a dashed line by increasing the drive current I. The characteristic DP4 almost coincides with the reference characteristic 1 shown in FIG. 5.

In the case where the reproduction image is sampled after the characteristic correction, the tone of the halftone image can be improved very much, though the density of the whole image might be brightened or darkened.

In the above-described embodiment, this invention is applied to a system in which the halftone image is reproduced by the dither method, the PWM processing, or the line. However, this invention can be applied to a system in which the halftone image is reproduced by changing the light quantity based on a light quantity control signal as shown in FIG. 7.

EMBODIMENT 3

Figure 7:
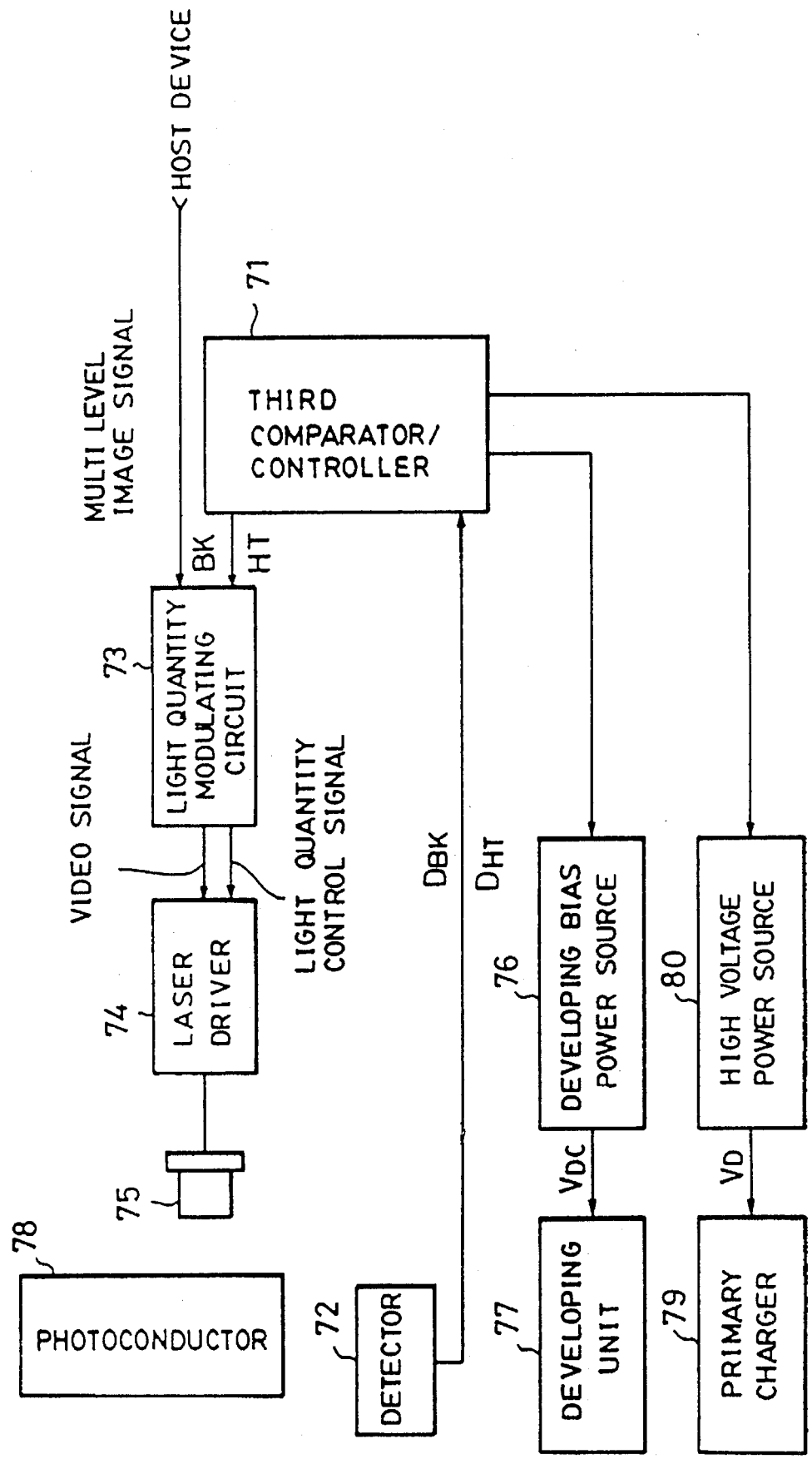
FIG. 7 is a block diagram showing an arrangement of a recording apparatus according to a third embodiment of the present invention.

FIG. 7 is a block diagram showing an arrangement of a recording apparatus according to the third embodiment of the present invention. The apparatus shown in FIG. 7 includes a comparator/controller 71 for outputting a solid image signal BK and a halftone image signal HT to a light quantity modulating circuit 73. The light quantity modulating circuit 73 turns on and off a laser driver 74, and modulates the light quantity to control the electrical potential of a latent image changeably when the laser driver 74 is turned on, based on the solid image signal BK, the halftone image signal HT, or a multi-level image signal output from a host device (not shown).

The apparatus also includes a photoconductor 78 on which a latent image is formed by a light beam irradiated from the laser 75 through a scanning unit (not shown), such as, a polygonal mirror, a Fθ lens, a reflection mirror, whereby a solid image, a predetermined halftone image, and a multi-level image are reproduced by a developing unit 77.

A detector 72 is provided for detecting a reflection density of the image reproduced on the photoconductor 78, and for outputting a density signal $D_{BK}$ corresponding to the solid image and a density signal $D_{HT}$ corresponding to the predetermined halftone image to the comparator/controller 71. The comparator/controller 71 obtains a density ratio between the density signal $D_{HT}$ and the density signal $D_{BK}$, compares the density ratio with a value C set in advance to obtain a difference $|(D_{HT}/D_{BK})-C|$, and executes a control to make the difference "0". In this embodiment, a developing bias applied to the developing unit 77, and a high voltage applied to the primary charger 79 are controlled. That is, the comparator/controller 71 controls a developing bias power source 76 and a high voltage power source 80 in parallel as shown in FIG. 8 to make the difference "0".

As described above, the comparator/controller 71 obtains the density ratio between the density signal $D_{HT}$ and the density signal $D_{BK}$ based on outputs from the detector 72, compares the density ratio with the value C set in advance to obtain the difference $|(D_{HT}/D_{BK})-C|$, and executes the control to make the difference "0".

In the above-described embodiment, the comparator/controller 71 controls a light quantity control signal applied to the laser driver 74, and controls the developing bias power source 76 and the high voltage power source 80 in parallel to make the difference "0". For example, the electrical potential $V_D$ of primary charge and the developing bias $V_{DC}$ shown in FIG. 8 is raised in the case where the density ratio $(D_{HT}/D_{BK})$ corresponding to a predetermined halftone image signal is smaller than the value C. Meanwhile, in the case where the density ratio $(D_{HT}/D_{BK})$ corresponding to the predetermined halftone image signal is greater than the value C, the electrical potential $V_D$ of primary charge and the developing bias $V_{DC}$ is dropped.

Figure 8:
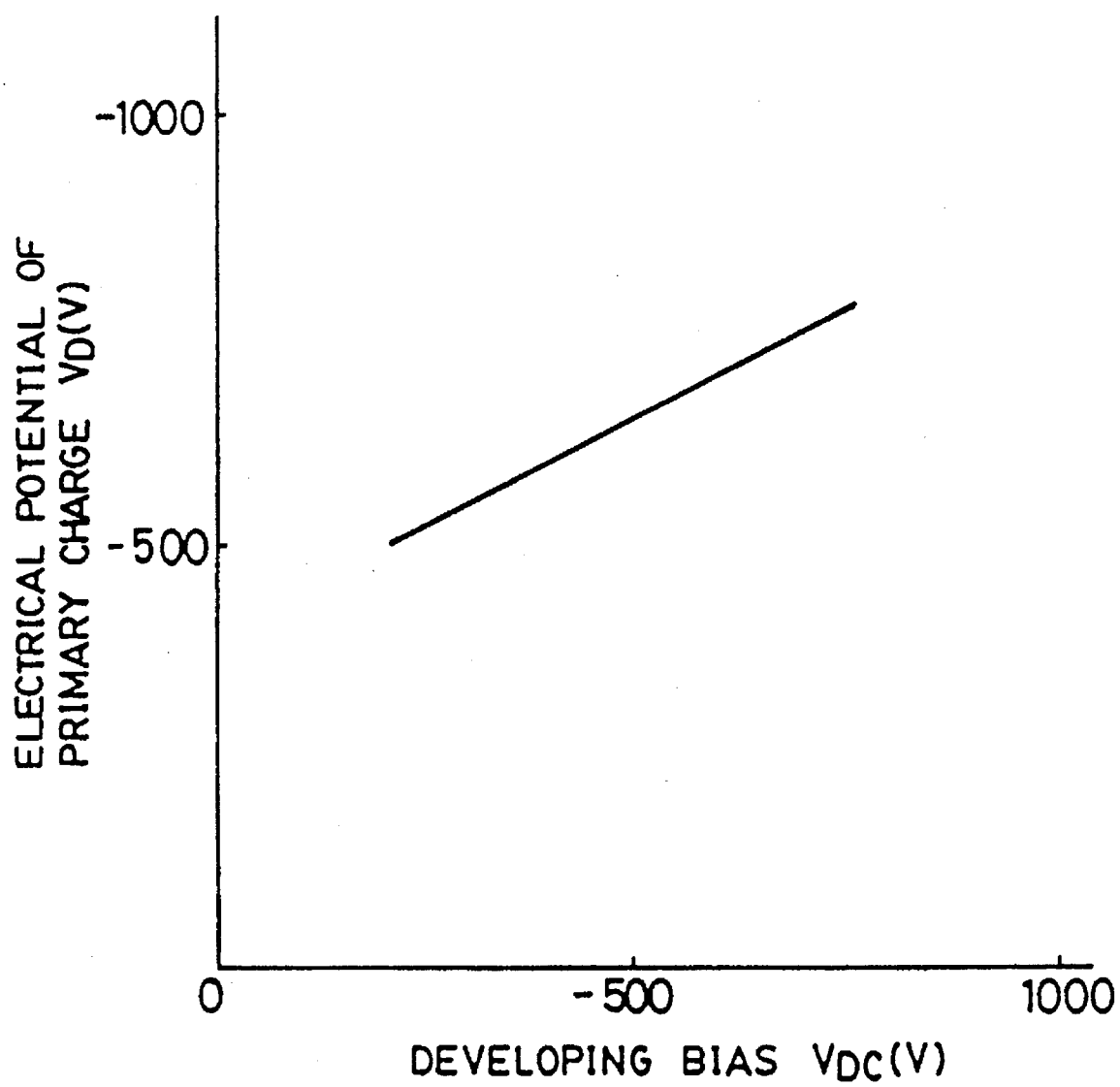
FIG. 8 is a chart showing an electrical potential characteristic between the developing bias power source and the primary charger shown in FIG. 7.

FIG. 8 is a chart showing an electrical potential characteristic between the developing bias power source 76 and the primary charger 79 shown in FIG. 7, wherein the vertical axis denotes the electrical potential $V_D$ of primary charge, and the horizontal axis denotes the developing bias $V_{DC}$.

According to the above-described structure, the tone of the halftone image can be improved very much, though the density of the sampled images might be brightened or darkened as a whole.

Figure 9:
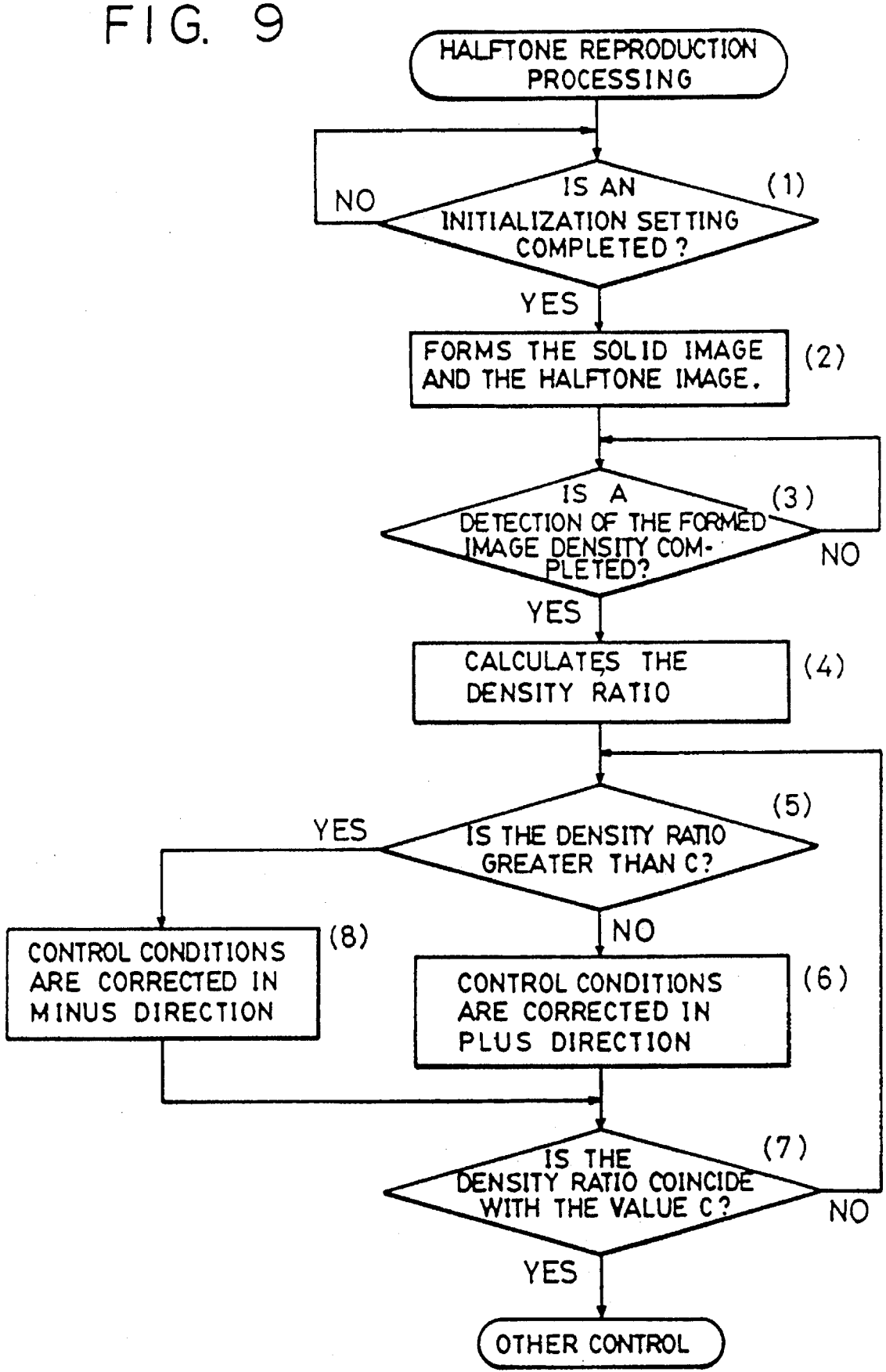
FIG. 9 is a flow chart for showing an example of halftone reproduction processing procedure in the recording apparatus.

FIG. 9 is a flow chart for showing an example of halftone reproduction processing procedure in the recording apparatus. In FIG. 9, numerals (1) through (8) denote each step.

In step (1), the program stored in the comparator/controller is in a "standby" state waiting for completion of an initialization setting relating to an image forming process. If the initialization setting is completed, the flow advances to step (2) to initiate the solid image and the halftone image formation.

In step (3), the program is in a "standby" state waiting for detection of the formed solid image density and the formed halftone image density by means of the detector. If the detection is completed, the comparator/controller calculates the density ratio $(D_{HT}/D_{BK})$ in step (4) and determines whether the calculated density ratio is greater than the value C set in advance in step (5). When in step (5) the answer is no, the flow advances to step (6), and the above-described various control conditions are corrected in the plus direction.

In step (7), it is determined whether the density ratio $(D_{HT}/D_{BK})$ coincides with the value C or not. If the answer in step (7) is yes, the flow advances to execute other control, but if the answer is no, the flow returns to step (5).

Meanwhile, when in step (5) the answer is yes, the flow advances to step (8), and the above-described various control conditions are corrected in the minus direction. Then the flow returns to step (7).

It should be understood that the method described above is not limited to a laser beam printer but may also be utilized in to a LED printer, an electrophotographic recording apparatus having a liquid crystal shutter array or other recording apparatuses.

In the above-described embodiments, the PWM method, the dither method, and the intensity-modulated method are used for detecting the density of the reproduced image. However, it is possible to use other halftone reproduction methods for detecting the density.

Further, in the above-described embodiment, the developing bias, the laser drive current, and the primary charge voltage are controlled for controlling the density. However, it is possible to control the distance between the photoconductor and a developing sleeve, or the speed of the developing sleeve; or to incorporate a delay circuit into a drive circuit of an exposure source so as to control the density.

Accordingly, the combination of the method for detecting the density and means for controlling the density can be selected properly.

According to the present invention, a fine halftone reproductivity, which is not affected by environmental conditions, can be held at all times at the most suitable state, with a simple structure and a low-priced cost.

EMBODIMENT 4

Figure 10:
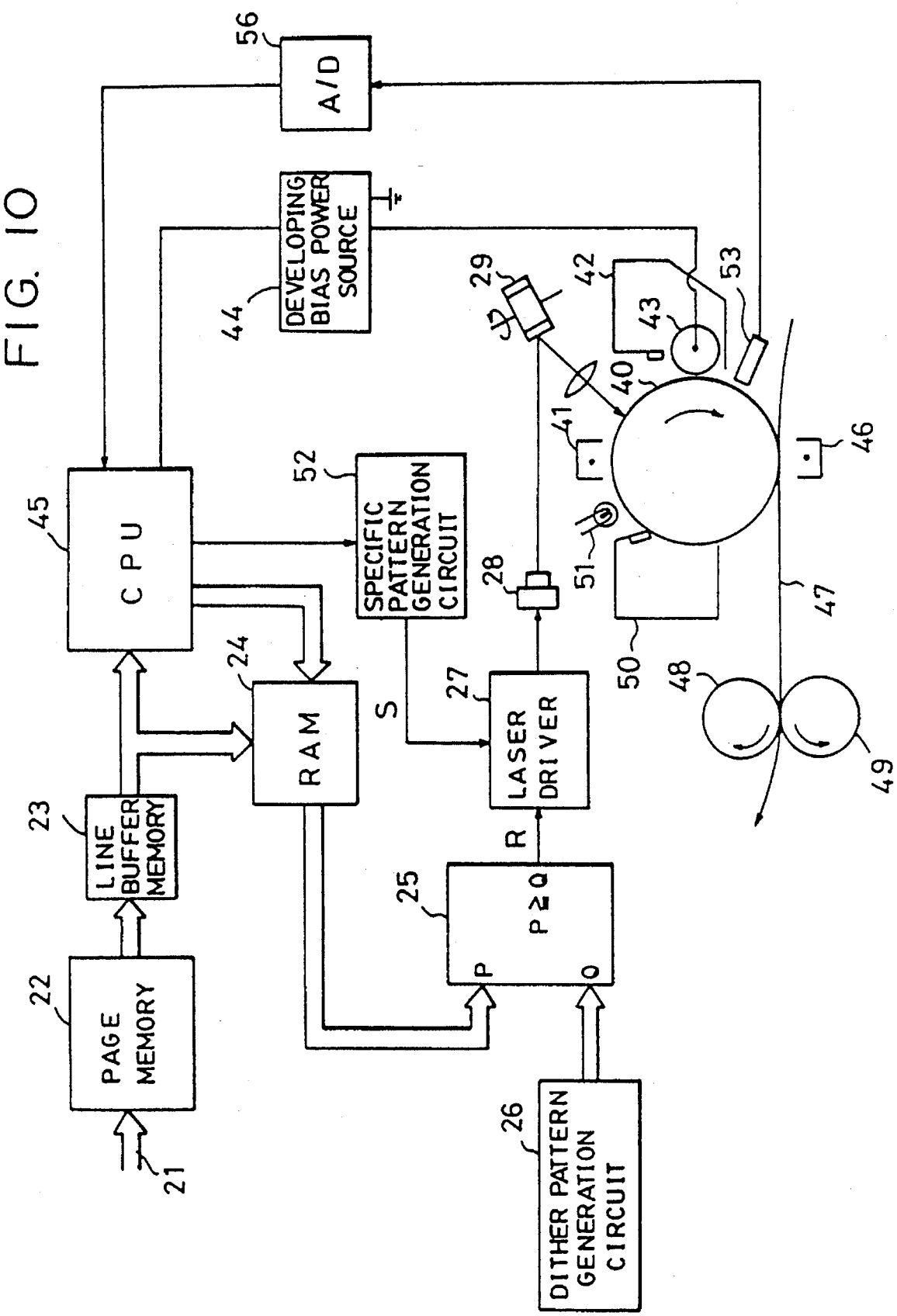
FIG. 10 is a block diagram showing an arrangement of a laser beam printer according to a fourth embodiment of the present invention.

FIG. 10 is a block diagram showing an arrangement of a laser beam printer according to the fourth embodiment of the present invention.

Figures 11, 12:
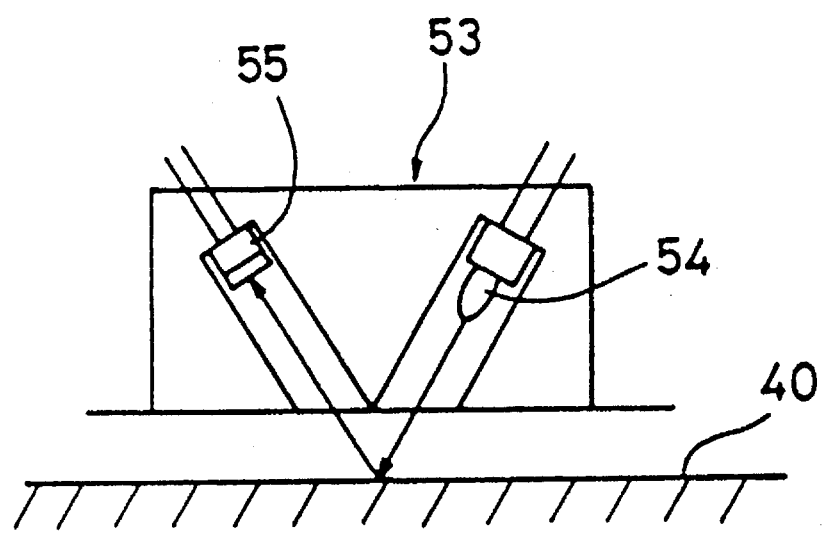
FIG. 11 is an illustration for explaining a dither matrix used in the fourth embodiment.
FIG. 12 is a cross-sectional view for explaining an arrangement of a density detector in the fourth embodiment.

FIG. 11 is an illustration for explaining a dither matrix used in the fourth embodiment.

Multi-level image data 21 composed of a digital signal is input to the laser beam printer shown in FIG. 10.

The laser beam printer includes a page memory 22 for storing image data for one page, a line buffer memory 23 for holding and outputting image data stored in the page memory 22 one line by one line, a RAM 24 for performing density gradation correction of halftone image density, and a comparator 25 for binarizing image data by comparing the image data with a predetermined threshold level.

The laser beam printer also includes a dither pattern generation circuit 26 for generating a dither pattern, and a specific pattern generation circuit 52 for generating a signal S to form a solid pattern.

A laser driver 27 is provided for driving and controlling turning on and off of a laser diode 28. The laser diode 28 receives signals from the laser driver 27, and irradiates a laser beam to a rotating polygonal mirror 29 when the laser diode 28 is turned on. The polygonal mirror 29 is rotated in the direction shown by arrow, and disposed at the position in which the irradiated laser beam is converted into a scanning beam being able to scan a photoconductor 40. The photoconductor 40 is rotatable during scanning in the direction shown by arrow.

A charger 41 is operably disposed adjacent the photoconductor 40, at a position upstream of where the scanning beam from the polygonal mirror 29 is received, for providing a uniform electrostatic charge.

A developing unit 42 for developing a latent image formed on the surface of the photoconductor 40 and a developing sleeve 43 for applying a developing bias are operably disposed at positions downstream of the scanning position of the photoconductor 40.

The laser beam printer also includes a developing bias power source 44 for applying the developing bias to the developing sleeve 43, and a CPU 45 which is operated by a program (the program complies with a flow chart of FIG. 13 described later) for controlling a value of the developing bias.

A density detector 53 is disposed at a position which is downstream from the developing sleeve 43 in the rotating direction of the photoconductor 40. Also included is an A/D converter 56.

A transfer charger 46 for transferring a developed pattern to a transfer material (recording sheet) 47 fed from a cassette (not shown) is disposed downstream of the density detector 53.

Heat fusing rollers 48, 49 are provided for heat fusing the developed pattern transferred on the recording sheet 47 in the feeding direction of the recording sheet 47 through the transfer charger 46.

A cleaner 50 and a pre-exposure unit 51, are disposed in turn around the photoconductor 40 downstream of the transfer charger 46.

The operation of the laser beam printer in FIG. 10 will be described below.

The image data 21 is input to the laser beam printer from an unshown device such as a reader for image reading, a magnetic disk device, or an external device, such as a controller, and is stored in the page memory 22.

In the fourth embodiment, the following explanation is made assuming the image data 21 is four (4) bit data.

The image data 21, which is arranged in the page memory 22 as four (4) bit multi-level signal, is read out successively to the line buffer memory 23 in company with the start of printing by the printer, and is digital-to-digital converted by the RAM 24 used as a look-up table after synchronizing with a video signal. The image data 21 is sent to a terminal P of the comparator 25 in synchronism with a reference clock (not shown) after the image data is converted by the RAM 24.

Meanwhile, data of dither matrix, such as data shown in FIG. 11, output from the dither pattern generation circuit 26 is sent to a terminal Q of the comparator 25 in synchronism with the reference clock. In the case where "P" denotes data input to the terminal P, and "Q" denotes data input to the terminal Q, output data "R" from the comparator 25 is sent to the laser driver 27 as "1", "0" when conditions P≧Q, P<Q, are satisfied, respectively. The laser driver 27 turns on and off the laser diode 28 in accordance with the output data R composed of "1" or "0".

The laser beam emitted from the laser diode 28 is converted into the scanning beam by the rotating polygonal mirror 29, thereby scanning the photoconductor 40. A portion of the scanning beam is received by a beam detector (not shown) so as to generate a signal that can use as a synchronizing signal of the video signal or the dither pattern generation circuit 26.

An electrostatic latent image is formed on the surface of the photoconductor 40 by receiving the scanning beam after the photoconductor 40 receives a uniform electrostatic charge by the charger 41. Then, the electrostatic latent image is developed by the developing unit 42.

A single component toner projection developing system is adopted for toner to adhere to portions in which the laser beam is irradiated.

The developing bias output from the developing bias power source 44 is applied to the developing sleeve 43.

The value of the developing bias is controlled by the CPU 45. The CPU 45 manages signals in each circuit, processes detected density data, or controls operations of each unit in the laser beam printer.

A developed pattern formed on the photoconductor 40 is transferred to the recording sheet 47 by the transfer charger 46, and is fixed on the recording sheet 47 by the heat fusing rollers 48, 49. The developer which is left on the surface of the photoconductor 40 without transferring is collected by the cleaner 50. Further, an electrical charge on the photoconductor 40 is erased by the pre-exposure unit 51, so that the same image forming process described above is repeated.

Explanations of a method for correcting image density in the printer will be described below.

Figure 13:
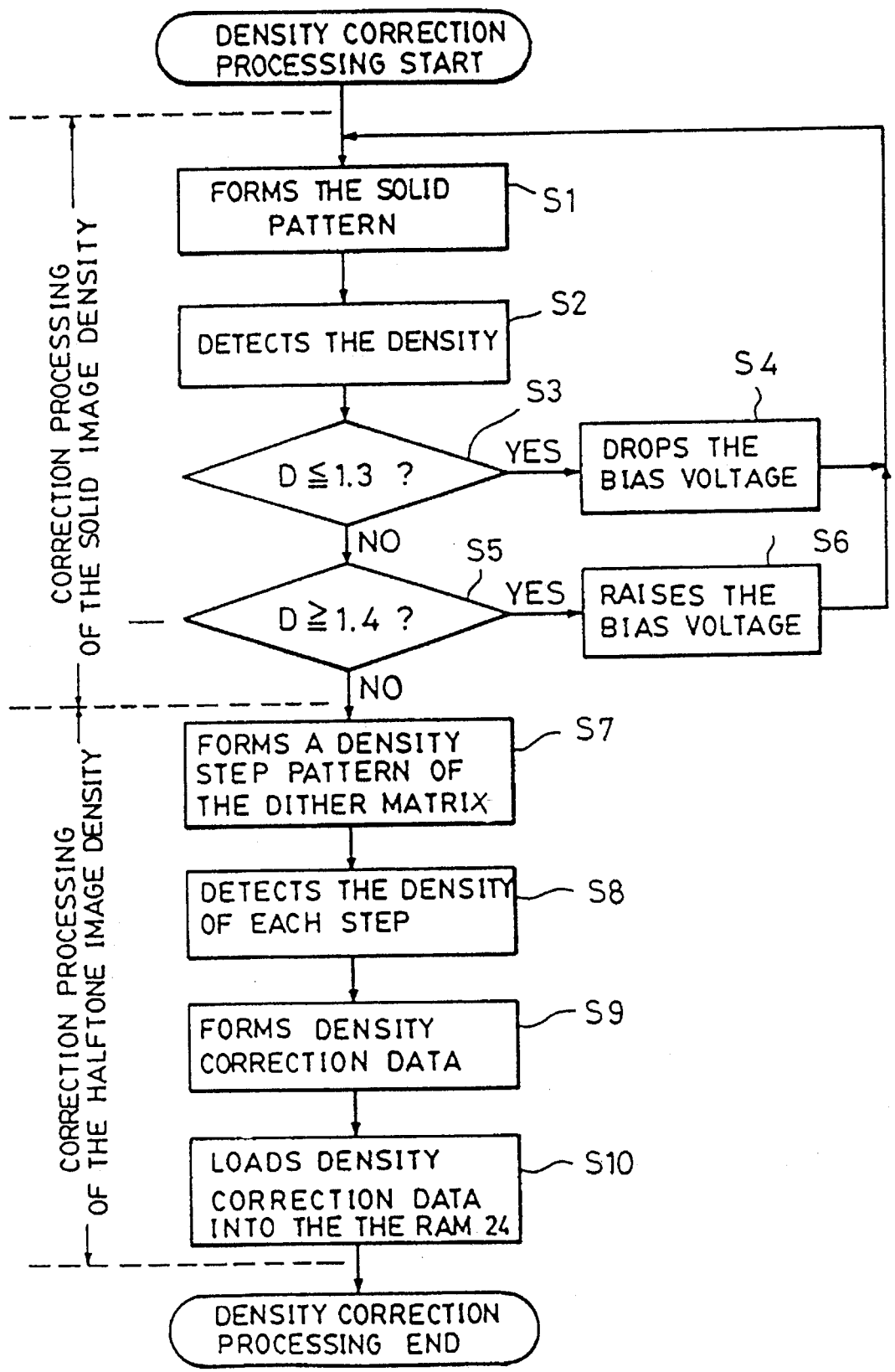
FIG. 13 is a flow chart for explaining an operation of image density correction processing in the fourth embodiment.
Figure 14:
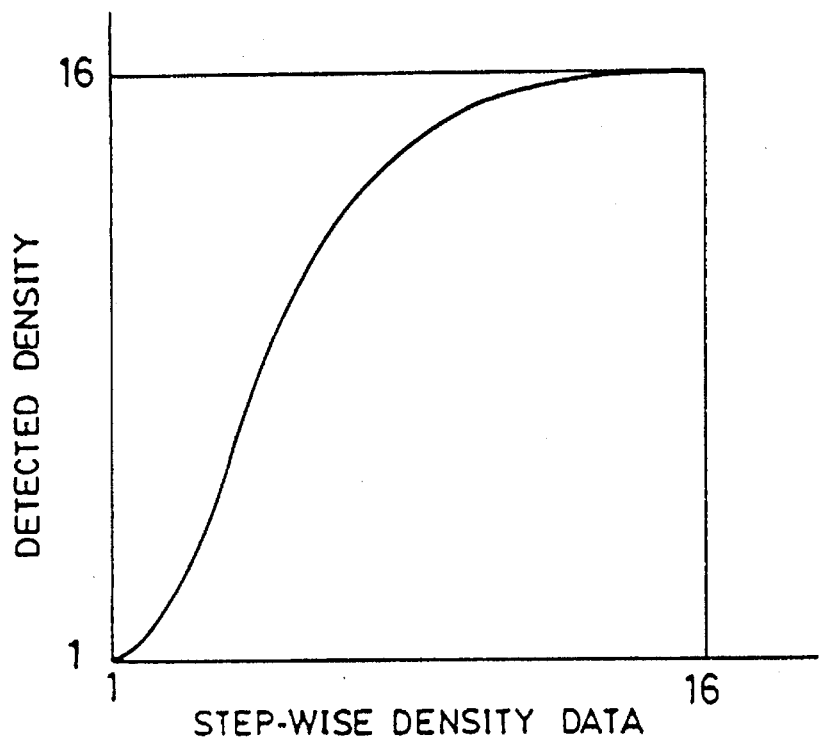
FIG. 14 is a chart showing the relation between stepwedge density data and detected density in the case of density correction according to the fourth embodiment.
Figure 15:
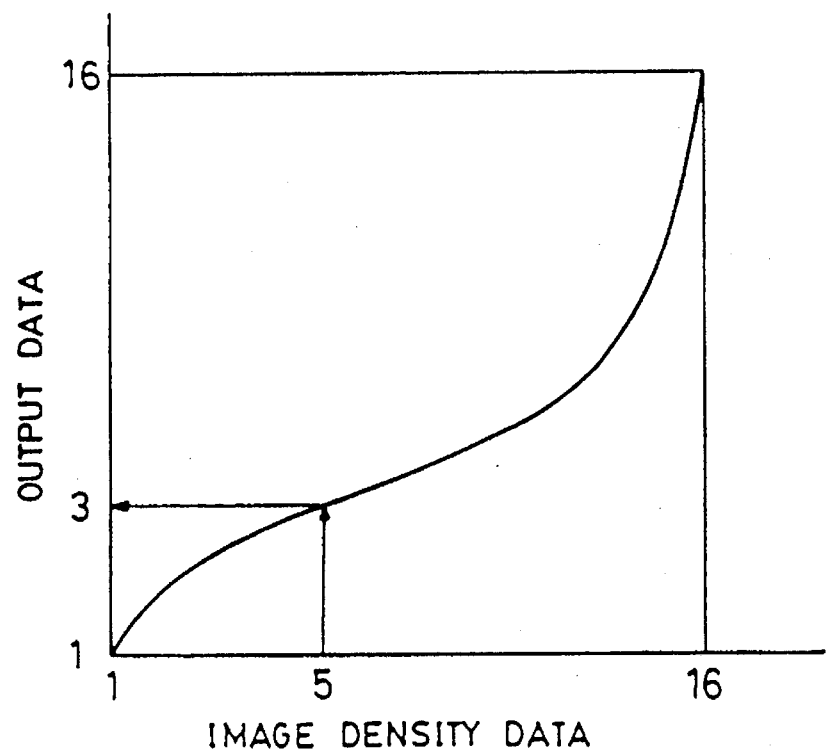
FIG. 15 is a chart showing the relation between image density data and output data in the case of density correction according to the fourth embodiment.

FIG. 12 is cross-sectional view for explaining an arrangement of the density detector 53 in the fourth embodiment. FIG. 13 is a flow chart for explaining an operation of image density correction processing in the fourth embodiment. FIG. 14 is a chart showing the relation between step-wise density data and a detected density in the case of density correction according to the fourth embodiment. FIG. 15 is a chart showing the relation between image density data and output data in the case of density correction according to the fourth embodiment.

In the fourth embodiment, the density of a solid pattern is preferably set to between 1.3 to 1.4 as shown in FIG. 13.

Density correction is performed before receiving the image data 21 after a power source is turned on. When power is supplied to a power source unit (not shown) of the printer and preparation for printing is completed, the specific pattern generation circuit 52 outputs the signal S for forming the solid pattern to the laser driver 27 by an instruction of the CPU 45. The solid pattern may have the smallest area which can be detected by the density detector 53, and is proper to be 10 mm×10 mm square desirably. The area of the solid pattern is not limited to 10 mm×10 mm square as long as the effect of the present invention does not deviate.

In step S1, the solid pattern signal S is used for forming the solid pattern image on the photoconductor 40 through a similar process to the signal R.

In step S2, the density of the solid pattern image is detected by the density detector 53. The density detector 53 detects a reflection density of the image formed on the photoconductor 40 by irradiating the photoconductor 40 with a light source 54, such as a LED, and by receiving the reflected light with a light receiving element 55, such as a pin-photodiode, as shown in FIG. 12. The density of the solid pattern image detected by the density detector 53 is supplied to the CPU 45 through the A/D converter 56.

The CPU 45 compares a predetermined reference density data with the input solid pattern density data D, and instructs the developing bias power source 44 to drop the bias output when the solid pattern density is light, i.e., D≦1.3, in step S4. Meanwhile, when the solid pattern density is dark, i.e., D≧1.4, the CPU 45 instructs to raise the bias output in step S6. The density of the solid pattern image is converged on a reference density by repeating the above-described procedure, so that the density correction processing of the solid pattern image is completed.

A density correction processing of a halftone image will be described below.

First of all, the specific pattern generation circuit 52 generates step-wedge pattern signals having 16 gradation levels, which is expressed by the dither matrix shown in FIG. 11, and forms a step-wedge image (a density step pattern) having 16 gradation levels on the photoconductor 40 in step S7. The density of each step in the density step pattern is detected by the density detector 53 in step S8. Step-wedge density detected by the density detector 53 shows, for example, a non-linear output image density characteristic in that halftone density portions are biased to dark density as shown in FIG. 14.

The CPU 45 forms density correction data shown in FIG. 15 based on density data detected by the density detector 53 in step S9, and outputs the formed density correction data to the RAM 24 in step S10. The image data 21 is digital-to-digital converted by the density correction data shown in FIG. 15, and is input to the terminal P of the comparator 25. For example, when a data "5" is input as the image data 21 to an address line of the RAM 24, a converted data "3" is output to a data line of the RAM 24, thereby the comparator 25 inputs the converted data "3".

Figure 16:
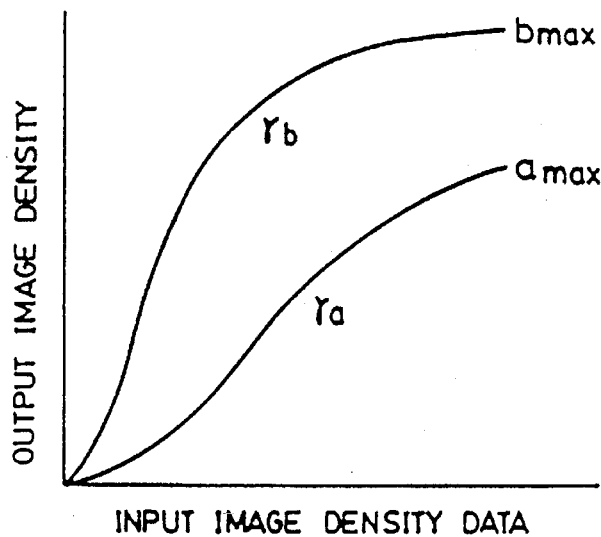
FIGS. 16 to 18 are charts for explaining characteristics according to the density correction in the fourth embodiment.
Figure 17:
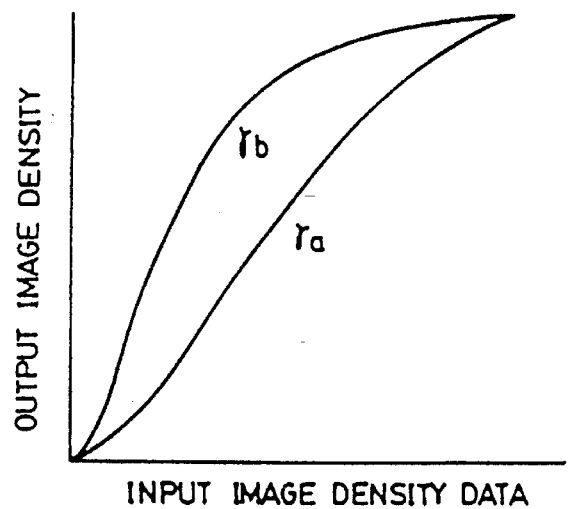
Figure 18:
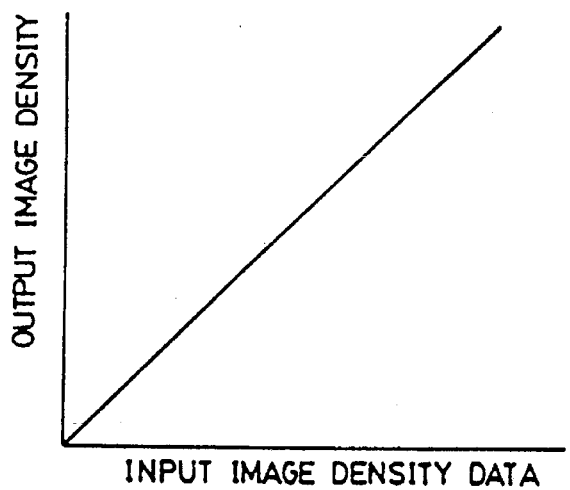

The above-described image density correction will be arranged with reference to FIG. 16 through FIG. 18.

FIG. 16 through FIG. 18 are charts for explaining characteristics according to the image density correction in the fourth embodiment.

In the case where the density correction is not performed to input image density data, the dispersions (two examples in this case) of output image density are represented in such a way that the variation rates of halftone image density change as characteristics $\gamma_1$, $\gamma_b$ when the maximum values of the solid image density are $a_{max}$, $b_{max}$, respectively as shown in FIG. 16. If only the solid image density is corrected to these changes, the maximum values $a_{max}$, $b_{max}$ of the solid image density can be equal to a fixed density as shown in FIG. 17. Further, if the halftone image density are corrected, the different variation rates $\gamma_a$, $\gamma_b$ can be fixed as shown in FIG. 18. Thereby, a linear and fixed output image density to input image density data can be obtained.

Accordingly, a high quality image can be provided.

According to the fourth embodiment, an image having a halftone can always be reproduced stably with a high quality.

In the above-described embodiment, the specific pattern generation circuit 52 has generated the solid pattern when the solid image density is corrected. However, it is also possible to generate a step-wedge pattern of 4×4 dither matrix, and to use the pattern of the density level "16" as the solid pattern.

In the above-described embodiment, the solid image density has been corrected based on a control by which the density detection and the density correction have been repeated to converge the density of the solid pattern image. However, it is also possible to calculate a necessary change amount of the developing bias based on the detected density data, and to make a fixed solid image density in one control.

EMBODIMENT 5

An explanation of the fifth embodiment will be described below.

Figure 19:
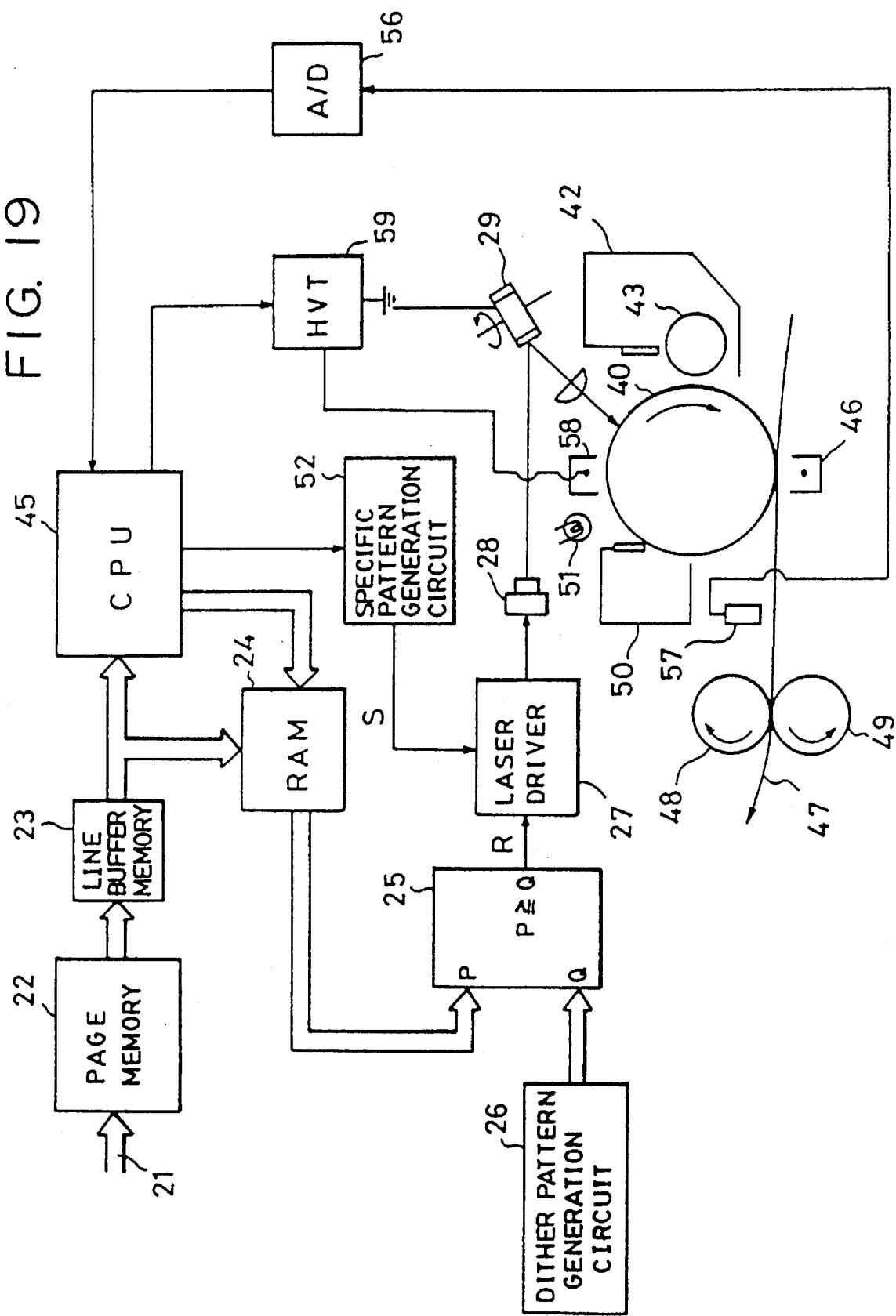
FIG. 19 is a block diagram showing an arrangement of a laser beam printer according to a fifth embodiment of the present invention.

FIG. 19 is a block diagram showing an arrangement of a laser beam printer according to the fifth embodiment of the present invention.

In the fifth embodiment, an image density detector 57 is provided for detecting an image density transferred on the recording sheet 47. The solid image density is corrected by controlling an applying voltage to a charger 58 for forming an electrostatic latent image, not by controlling the developing bias output.

A high voltage power source (HVT) using for charging is provided for outputting a high voltage to the charger 58.

The other elements in FIG. 19 are similar to like-numbered elements in the fourth embodiment, so that explanations thereof are omitted.

According to the fifth embodiment, there is the advantage that the image quality deterioration caused by the transferring can also be corrected because the image density on the recording sheet 47 is detected. However, the member for the density correction should be as least as possible because the recording sheet 47 is used for the image density correction.

According to the fifth embodiment, there is the further advantage that a necessary electrostatic latent image required for developing is secured because the electrostatic latent image is controlled.

EMBODIMENT 6

An explanation of the sixth embodiment will be described below.

Figure 20:
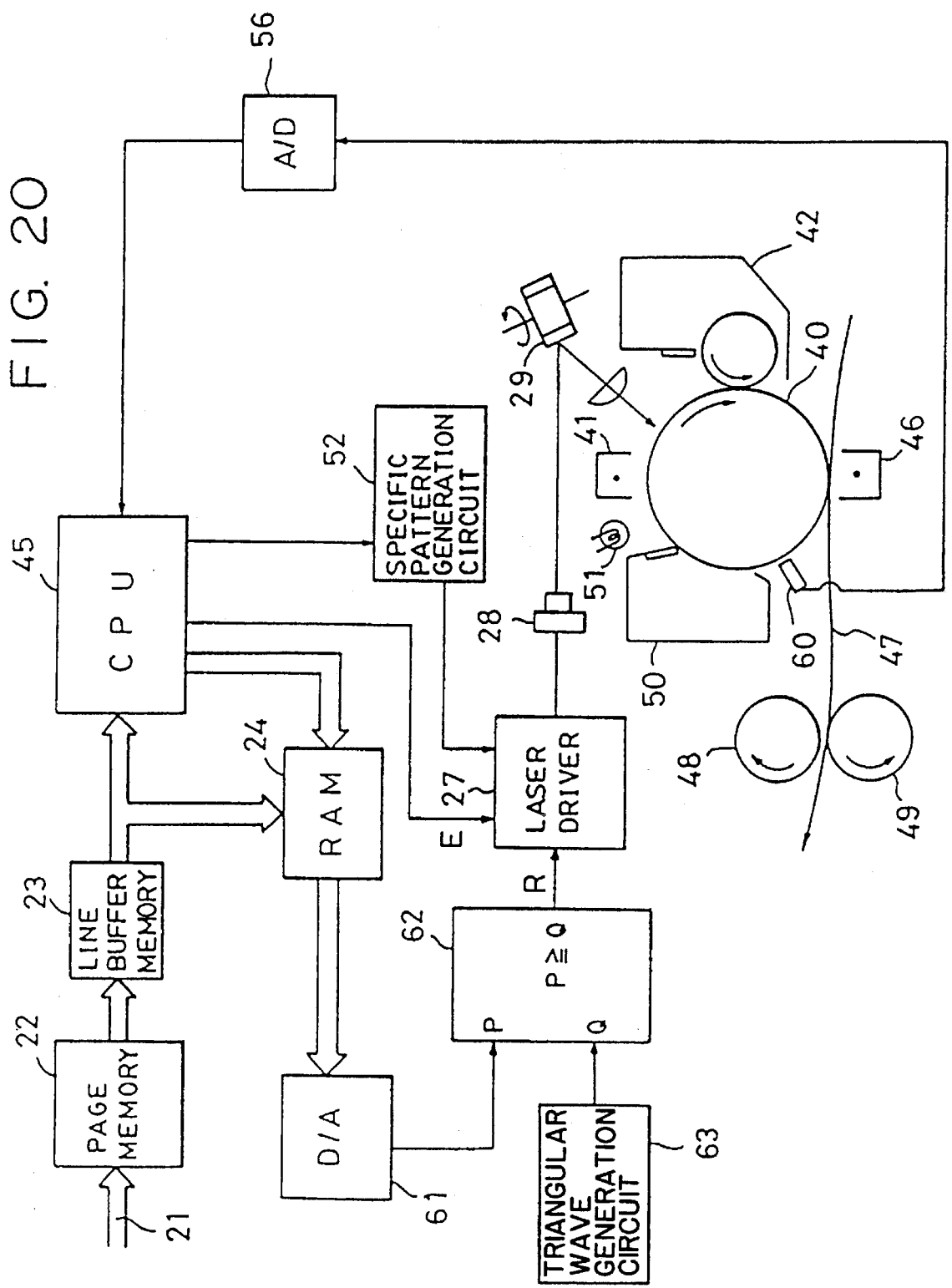
FIG. 20 is a block diagram showing an arrangement of a laser beam printer according to a sixth embodiment.

FIG. 20 is a block diagram showing an arrangement of a laser beam printer according to the sixth embodiment of the present invention.

An image density detector 60 is provided just before the cleaner 50, for detecting a reflection density of the image that remains on the photoconductor 40 after transferring. The position of the image density detector 60 has an advantage in respect that it has comparatively enough space for measuring the image density on the photoconductor 40.

The solid image density correction is executed by controlling a laser light quantity. A control signal (such signal is denoted as "E" in FIG. 20) for controlling the laser light quantity is input to the laser driver 27 from the CPU 45.

In this embodiment, the pulse-width control method, which controls turning on time of the laser beam, is used for forming a halftone image. For this reason, the image data 21 digital-to-digital converted by the RAM 24 is input to a terminal P of an analog comparator 62 through a D/A converter 62.

A triangular wave generation circuit 63 is provided, and it's output is input to a terminal Q of the analog comparator 62. The analog comparator 62 compares the image data with the triangular wave, and the laser diode 28 is turned on only when a condition $P \geq Q$ is satisfied, so that the laser beam is pulse-width-modulated.

The density correction of a halftone image, i.e., the correction of a pulse-width is performed while the laser beam is turned on. The method for the density correction is basically the same as the method described in the fourth embodiment. The density correction is performed by converting the input image data into a density correction data loaded into the RAM 24.

According to the sixth embodiment, the laser light quantity control is used for the solid image density correction, which corrects an electrophotographic recording characteristic. Therefore, a correction signal of the laser light quantity can be processed by the laser driver 27, and a high voltage control like the one shown in the fourth or the fifth embodiments is not required.

In the above-described embodiments, the dither methods, the pulse-width control method are used as halftone image forming methods. However, it is possible to use the error dispersion method or the light quantity modulation method.

In the above-described embodiment, the image density correction is executed when the power of the printer is turned on. However, it is also possible to execute the image density correction during a pre-rotation for a printing, a post-rotation for a printing, or an interval of each printing (recording sheet).

It should be understood that the image forming apparatus of this invention is not limited to a laser beam printer but may also be a LED printer, a LCD printer or other electrophotographic recording apparatus.

According to the present invention, the maximum density of an image having a halftone can be darkened. Further, there is the advantage that a high quality image can always be provided stably with a superior halftone gradation.

EMBODIMENT 7

Figure 21:
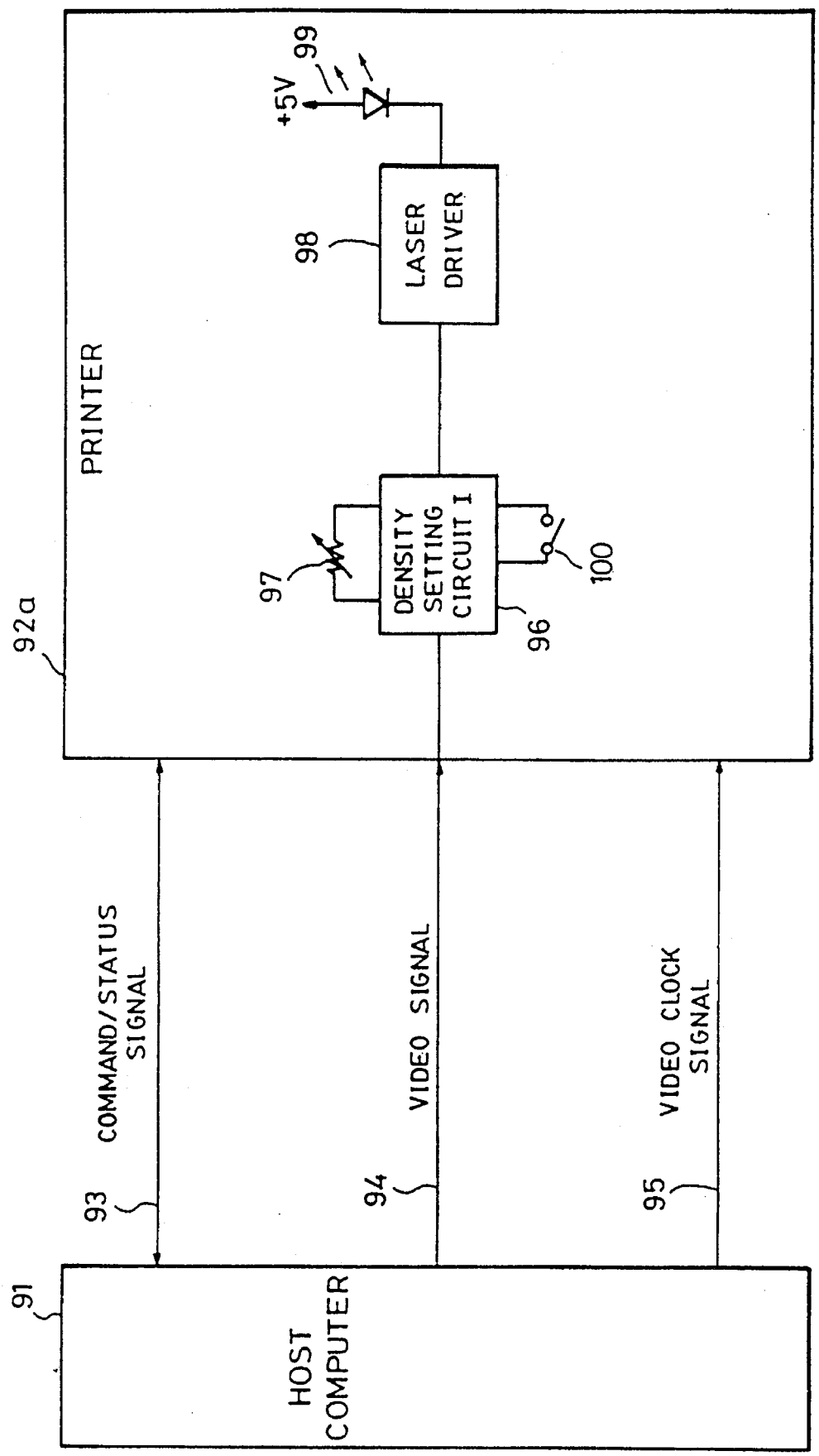
FIG. 21 is a block diagram showing an arrangement of an image forming apparatus according to a seventh embodiment.
Figure 22:
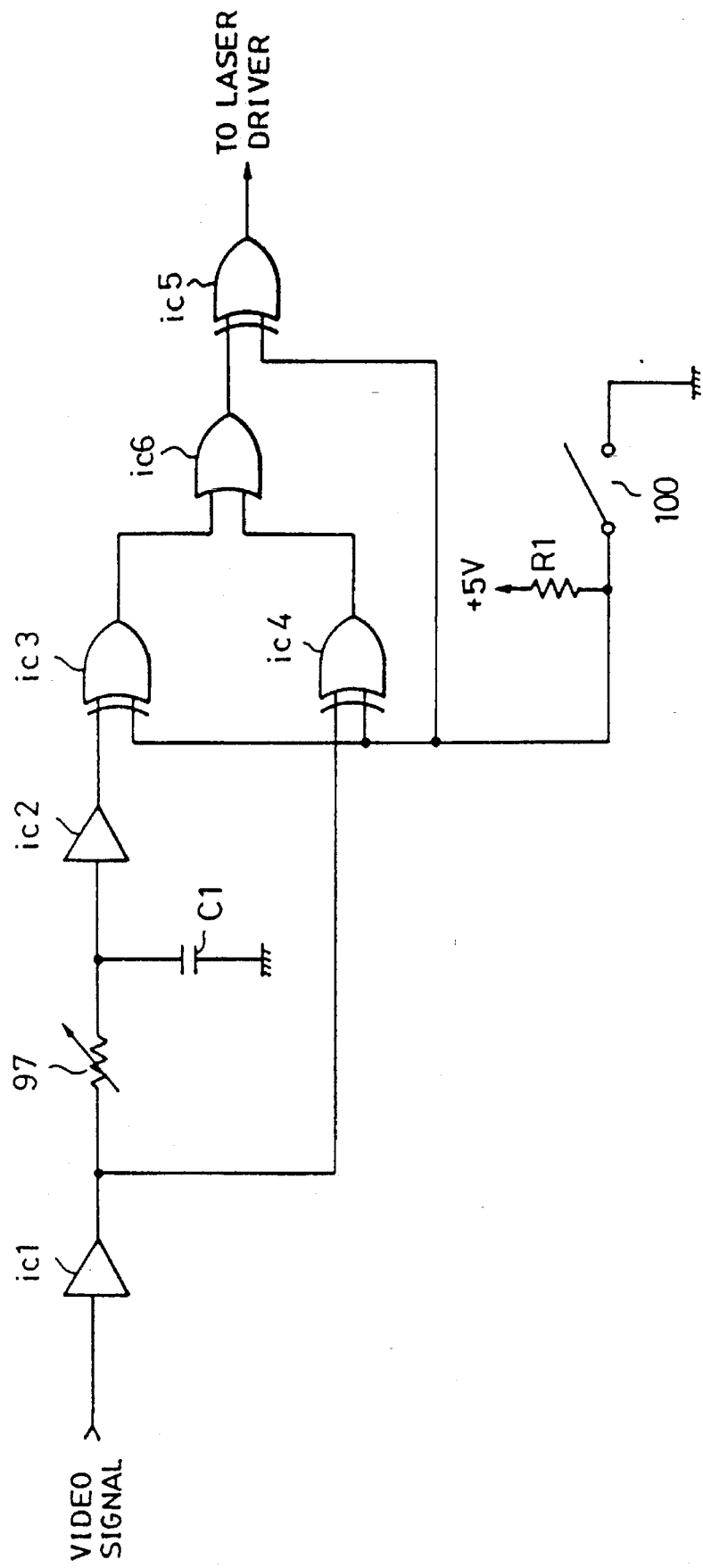
FIG. 22 is a detailed circuit diagram of a density setting circuit in the seventh embodiment.
Figure 23:
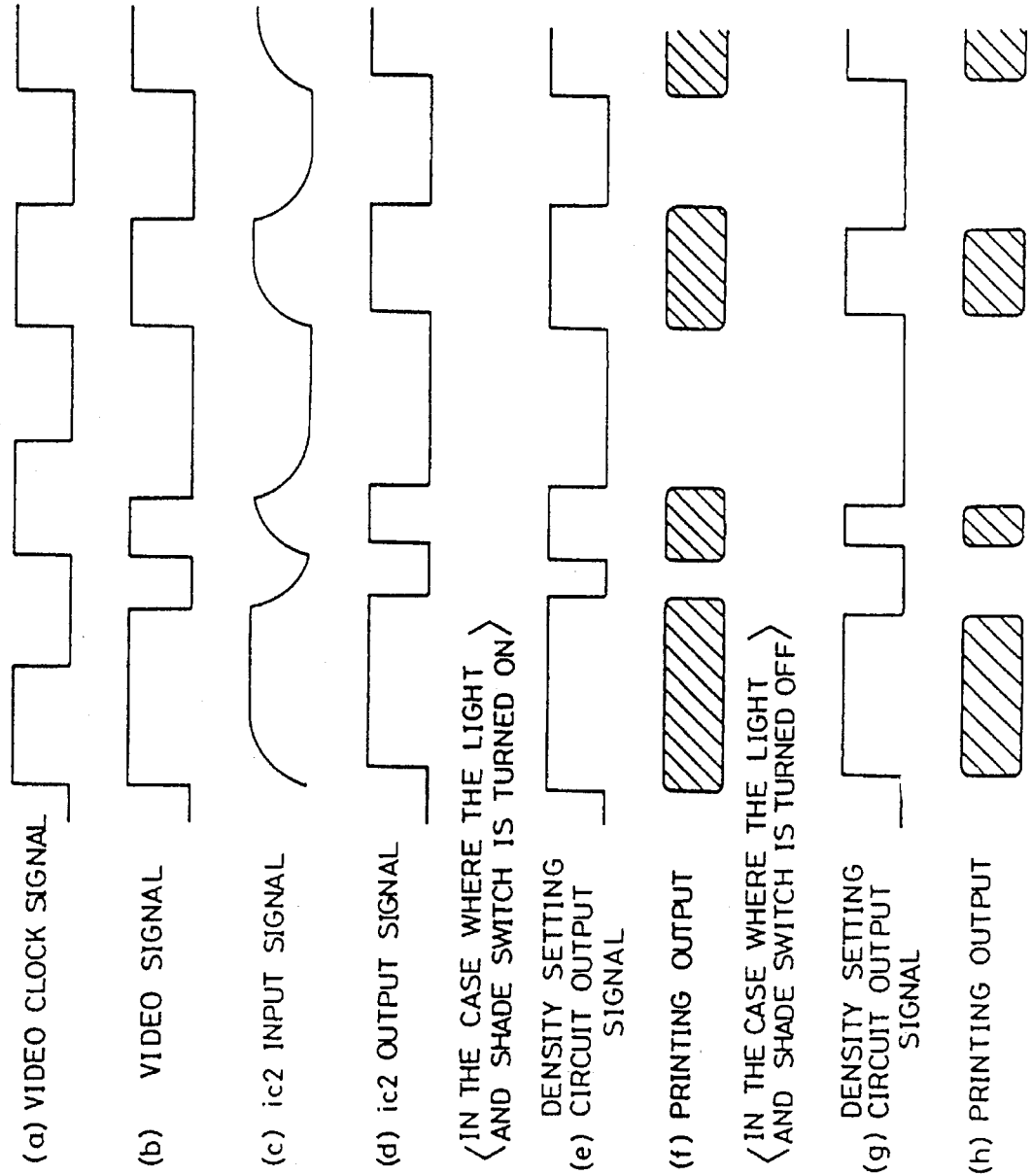
FIG. 23 is a timing chart for signals produced in the seventh embodiment.

FIG. 21 through FIG. 23 show the seventh embodiment of the present invention. FIG. 21 is a block diagram showing an arrangement of a host computer, a printer, and an interface thereof. FIG. 22 is a detailed circuit diagram of a density setting circuit I shown in FIG. 21. FIG. 23 is a timing chart for signals shown in FIG. 21.

A command signal, such as a command for setting printing conditions, is transmitted to a printer 92a from a host computer 91 through a command/status signal line 93 as shown in FIG. 21. The printer 92a transmits a reply complying with command signal to the host computer 91 as a status signal. Then, a pulse-width-modulated video signal 94 is transmitted to the printer 92a in synchronism with the a video clock signal 95. A density setting circuit I (96) changes the pulse-width of the video signal 94, and the video signal 94 is input to a laser driver 98. Then a semiconductor laser 99 is driven so as to irradiate a photosensitive drum (not shown), whereby printing is carried out by the electrophotographic method.

FIG. 22 is a detailed circuit diagram of the density setting circuit I (96) shown in FIG. 21. The circuit shown in FIG. 22 includes a density adjusting variable resistor 97, a light and shade change switch 100, and buffers ici, ic2. The circuit also includes exclusive-OR logic circuits ic3 to ic5, and an inclusive-OR logic circuits ic6.

As depicted in FIG. 23, the video signal 94 is integrated in accordance with a time constant, which is determined by the density adjusting variable resistor 97 and a condenser c1. The integrated signal is input to the buffer ic2 to output a delayed signal compared with the video signal 94. The pulse-width of an output video signal is lengthened or shortened according to turning on or off of the light and shade change switch 100.

According to the above-described structure, in the case where the light and shade change switch 100 is turned on, the pulse-width of the output video signal 94 can be widened by the density adjusting variable resistor 97, thereby the printing density can be darkened. Meanwhile, in the case where the light and shade change switch 100 is turned off, the pulse-width of the output video signal 94 can be narrowed by the density adjusting variable resistor 97, thereby the printing density can be brightened.

EMBODIMENT 8

Explanations of the eighth embodiment will be given below with reference to FIG. 24 through FIG. 26 and FIG. 31 through FIG. 33.

In the eighth embodiment, a printing density is designated by a command signal sent from a host computer 91.

Figure 24:
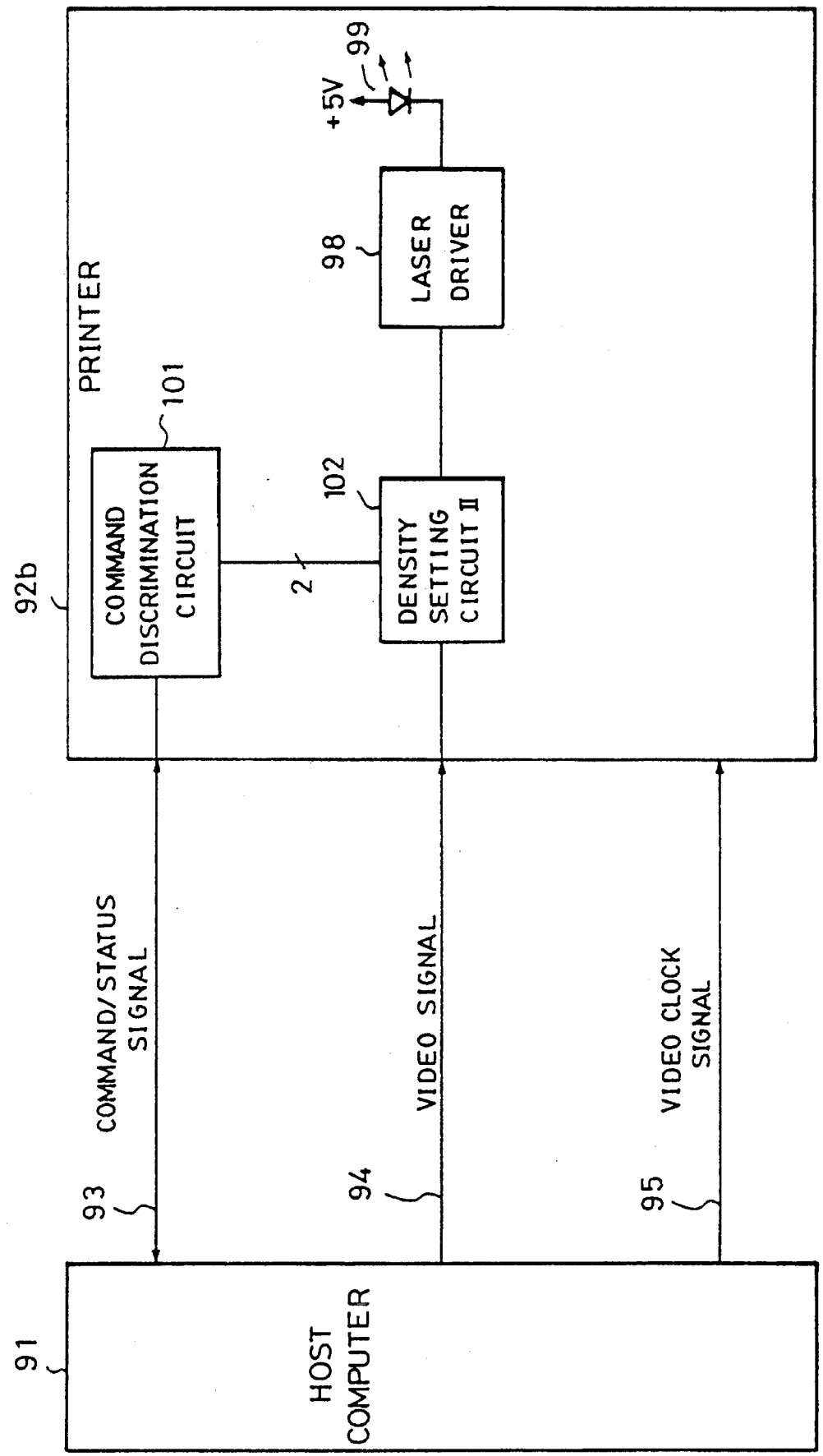
FIG. 24 is a block diagram showing an arrangement of an image forming apparatus according to an eighth embodiment.

FIG. 24 is a block diagram showing an arrangement of the host computer 91, a printer 92b, and the interface thereof. In FIG. 24, the same reference numerals are used to denote elements similar to those shown in FIG. 21.

The printer 92b shown in FIG. 24 includes a command discrimination circuit 101 for discriminating a command signal sent from the host computer 91, and a density setting circuit II (102).

When a command signal for designating a printing density is transmitted to the command discrimination circuit 101 from the host computer 91, the command discrimination circuit 101 outputs a 2 bit density designation signal, which is described below, to the density setting circuit II (102).

Figure 25:
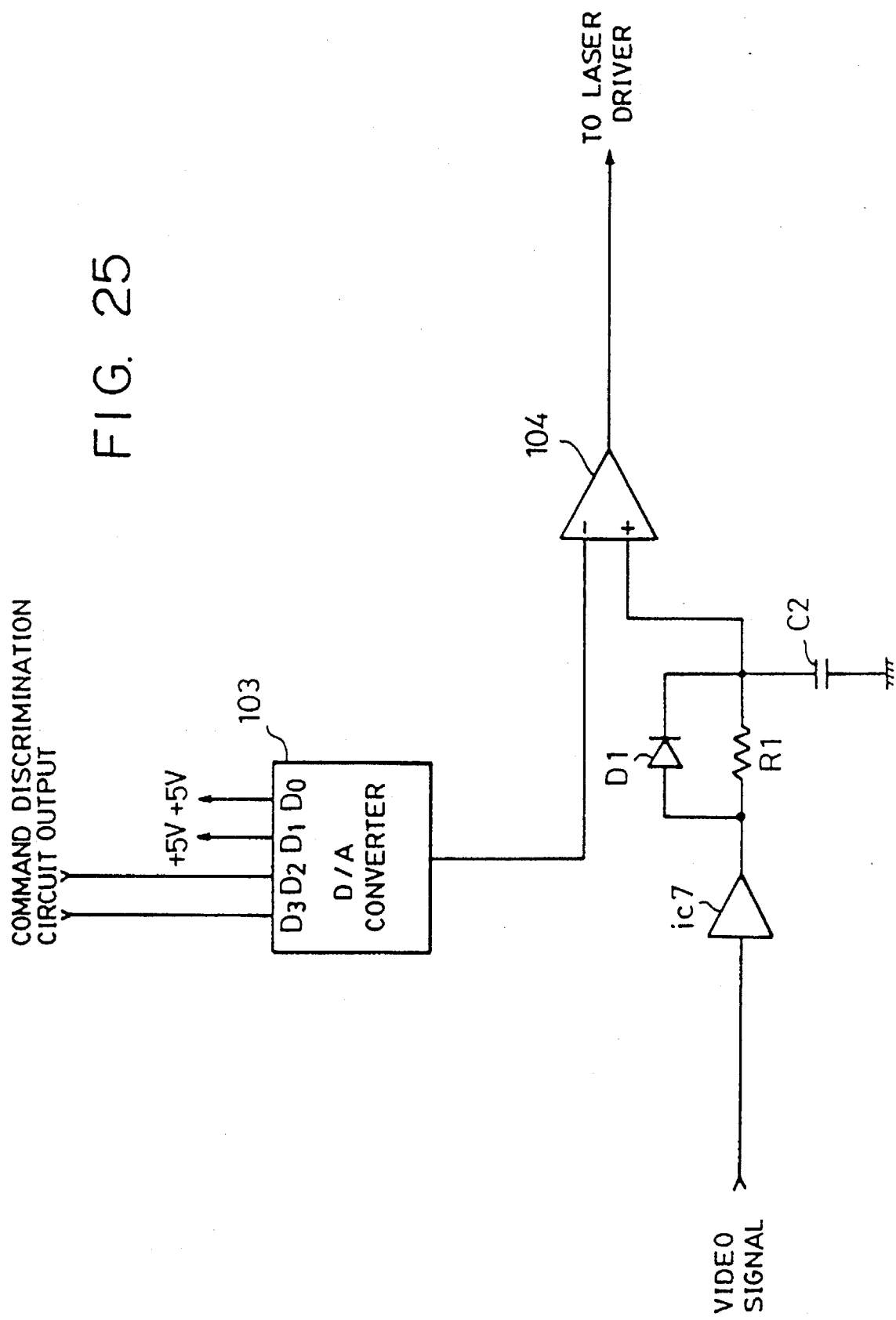
FIG. 25 is a detailed circuit diagram of a density setting circuit II in the eighth embodiment.
Figure 26:
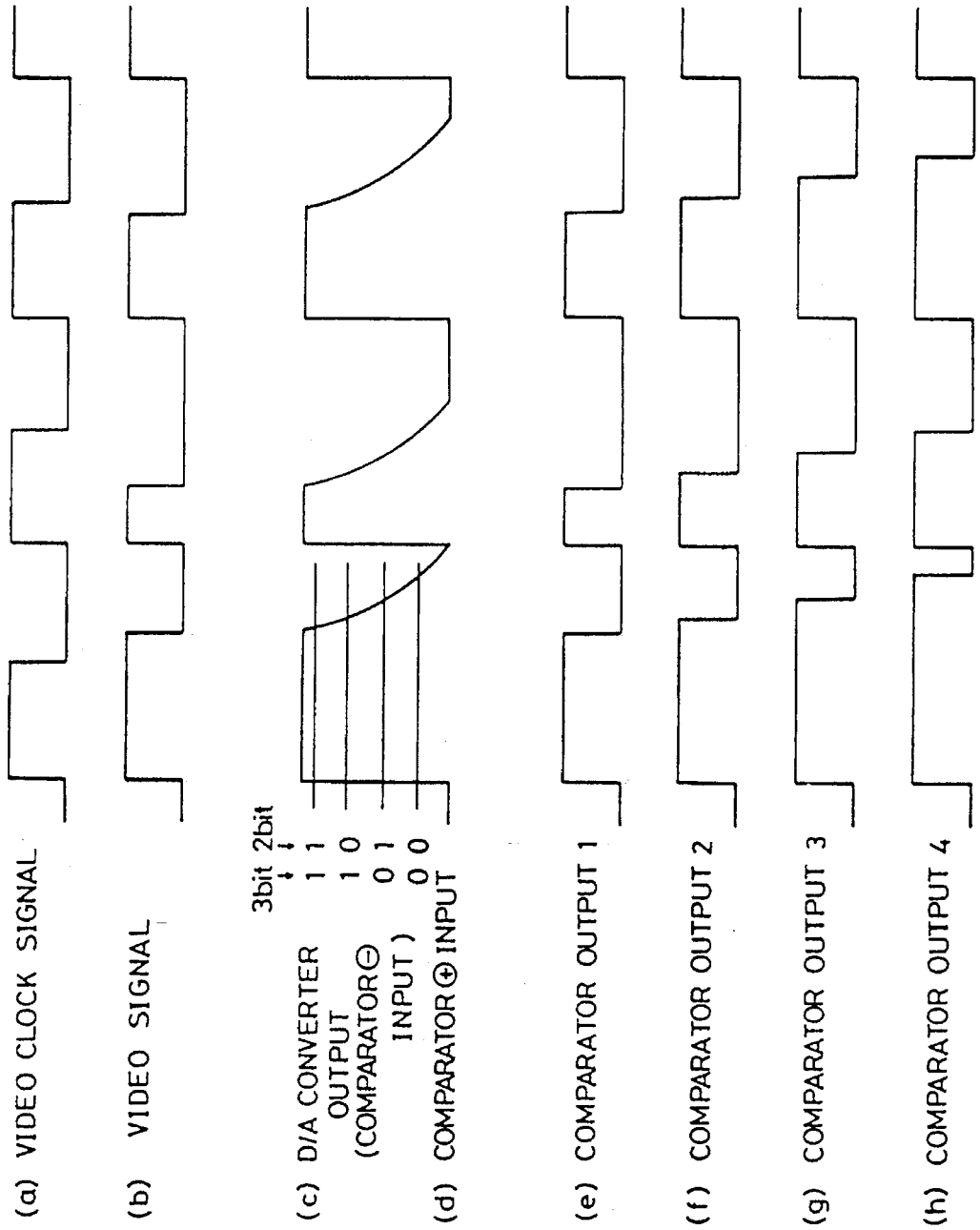
FIG. 26 is a timing chart for signals produced in the eighth embodiment.

FIG. 25 is a detailed circuit diagram of the density setting circuit II (102).

The above-described 2 bit density designation signal is input to terminals $D_3$ (one bit) and $D_2$ (one bit) of a D/A converter 103. Terminals $D_0$ and $D_1$ are held in a logic high state.

The relation between the input signal of the D/A converter 103 and the output voltage thereof is described in the following table.

| The relation between input and output of the D/A Converter | | | | |
|---|---|---|---|---|
| Input | | | | Output |
| $D_3$ | $D_2$ | $D_1$ | $D_0$ | [V] |
| 1 | 1 | 1 | 1 | 4.6875 |
| 1 | 0 | 1 | 1 | 3.4375 |
| 0 | 1 | 1 | 1 | 2.1875 |
| 0 | 0 | 1 | 1 | 0.9375 |

In the eighth embodiment, the input video signal 94 is deformed by a condenser C2 and a resistor R1. A comparator 104 inputs the deformed video signal and the output of the D/A converter 103, and changes the pulse-width of the input video signal in accordance with the comparison result to vary the printing density (see FIG. 26). When a command signal designating the darkest printing is transmitted from the host computer 91, the command discrimination circuit 101 outputs a 2 bit signal "OOB". The 2 bit signal "OOB" is input to the D/A converter 103, and the output voltage thereof becomes 0.9375[V]. This situation corresponds to a comparator output 4 shown in FIG. 26 (h).

According to the eighth embodiment, the density of a printing output image can be adjusted by a command signal sent from a host computer.

In the above-described embodiment, explanations were given about processing for widening the pulse-width of the video signal. However, it should be understood that processing for narrowing the pulse-width of the video signal is also available.

The command discrimination circuit 101 is structured with a central processing unit (not shown; such central processing unit is referred to as "CPU"). The CPU receives a density command signal composed of 8 bit serial signal sent from the host computer with its serial communication port, and transmits the 2 bit density designation signal to the density setting circuit II (102) in accordance with the density command signal.

Figure 31:
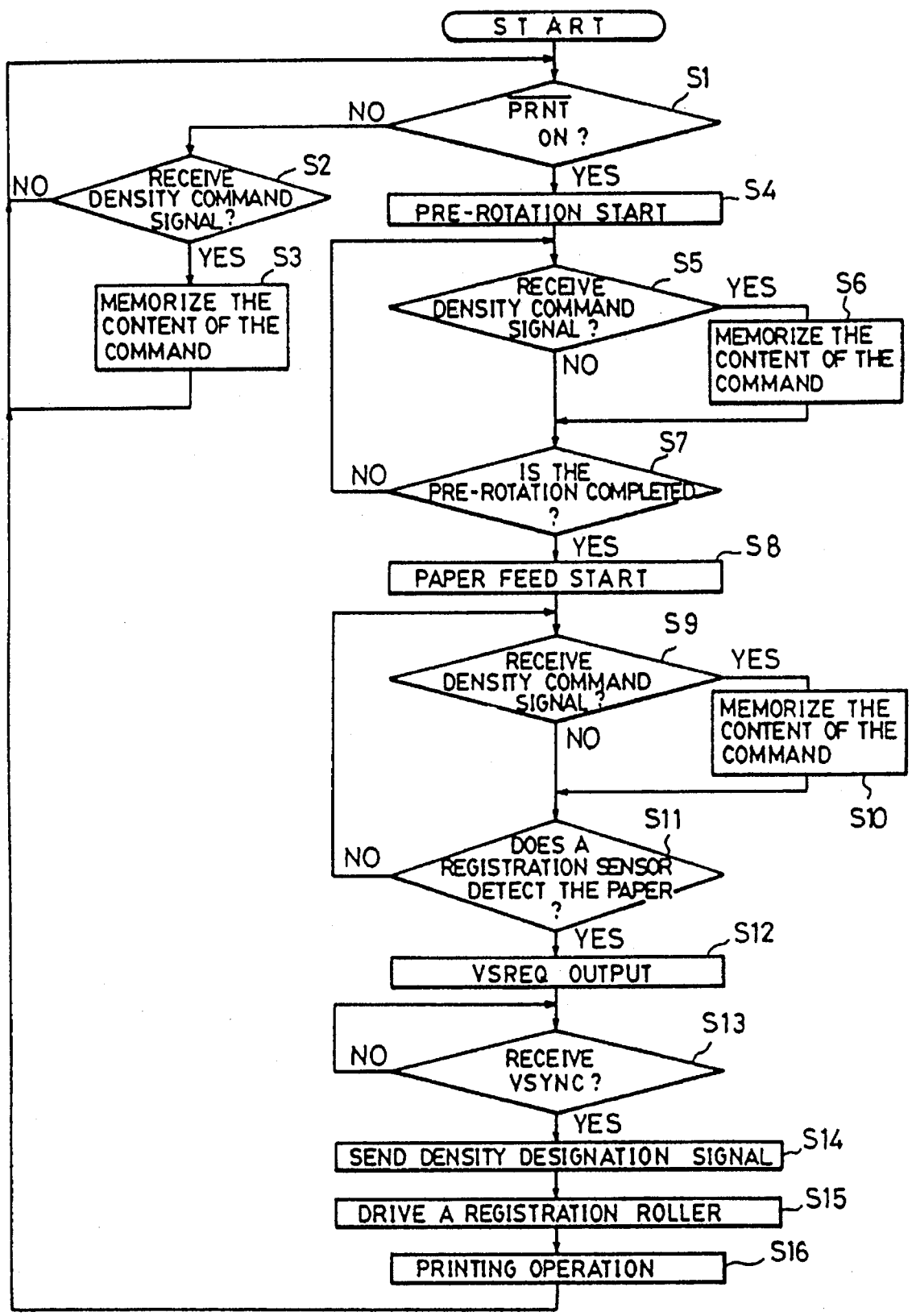
FIG. 31 is a flow chart showing a control operation by a CPU according to the eighth embodiment.
Figure 32:
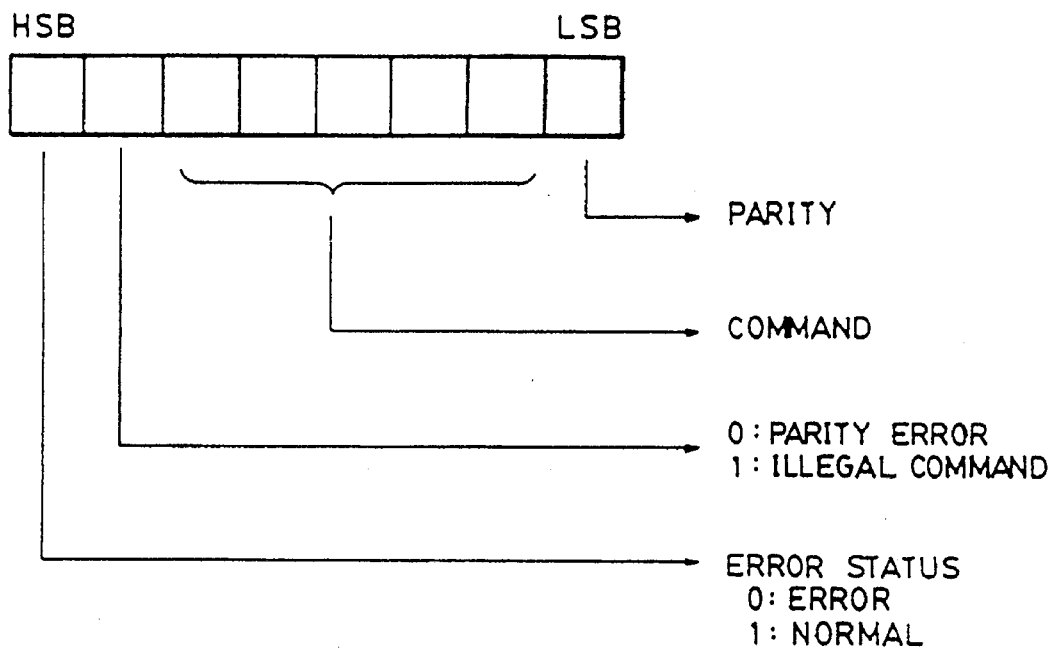
FIG. 32 is an illustration showing a structure of a command signal.

FIG. 31 is a flow chart showing a control operation by the CPU. FIG. 32 is an illustration showing a structure of the command signal.

In step S1, the CPU checks whether a print start signal PRNT sent from the host computer 91 is available or not.

In step S2, the CPU checks whether the density command signal is sent from the host computer 91 when the print start signal PRNT is not available. When the density command signal is sent, the CPU memorizes the content of the density command signal in step S3. Various kinds of commands, such as, the density command, a sheet size command, and a printing resolution command are sent as command signals.

If the print start signal PRNT is available, the flow advances to step S4, where a pre-rotation for initializing a photosensitive drum is started. In step S5, the CPU checks the density command signal during the pre-rotation. If the CPU receives the density command signal, the CPU memorizes the content of the density command signal in step S6.

In step S7, the CPU checks whether the pre-rotation is completed or not. If the pre-rotation is completed, the flow advances to step S8, where a paper feeding is started. In steps S9 and S10, the CPU executes the same control with steps S5 and S6.

In step S11, the CPU checks whether a registration sensor disposed before the photosensitive drum detects the paper or not. If the registration sensor detects the paper, the CPU outputs a command signal VSREQ for requesting a vertical synchronization'signal VSYNC to the host computer 91 in step S12.

When the vertical synchronization signal VSYNC is sent from the host computer in step S13, the CPU sends the 2 bit density designation signal to the density setting circuit II (102) in accordance with the received density command (step S14).

Figure 33:
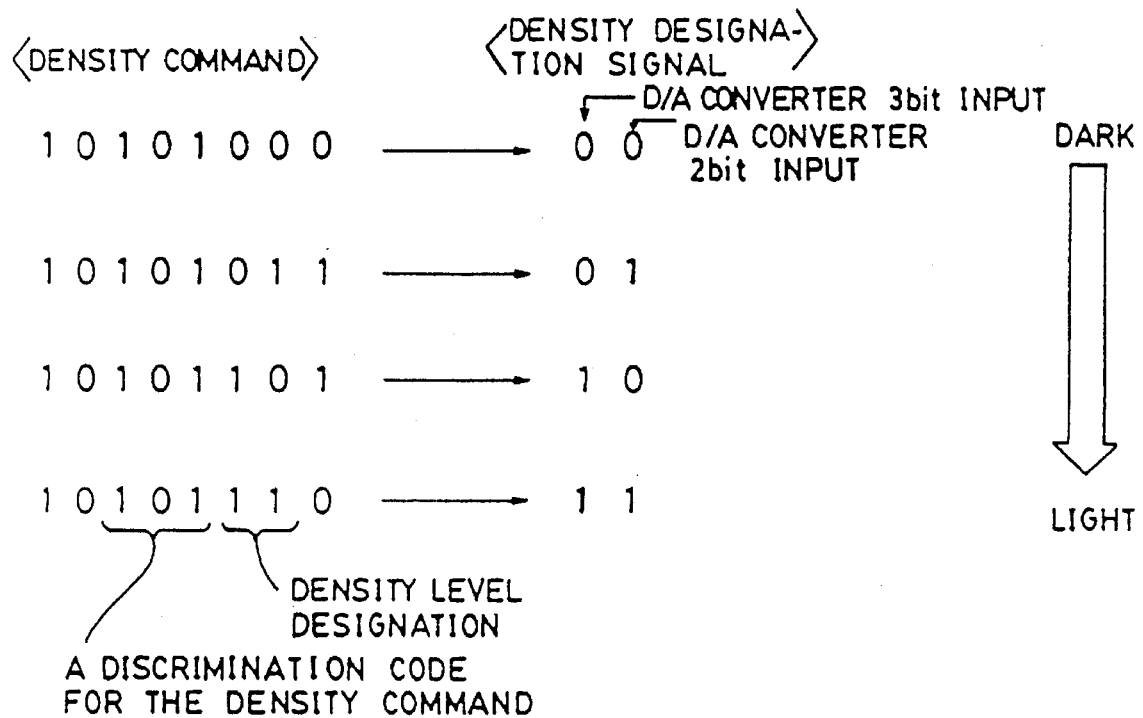
FIG. 33 is a chart showing the relation between a density command signal and a density designation signal.

FIG. 33 is a chart showing the relation between the density command signal and the density designation signal.

In step S15, the CPU drives a registration roller for feeding the paper. Then, in step S16, a printing operation is carried out, and the flow returns to step S1.

The structure of the command signal will be given below with reference to FIG. 32.

The command signal is composed of 8 bit signal, wherein two most significant bits denotes an error, and six least significant bits denotes the content of the command. The least significant bit (LSB) is a parity bit. FIG. 33 shows an example of the density command signal, wherein a code "101" is used for discriminating the density command signal.

EMBODIMENT 9

Figure 27:
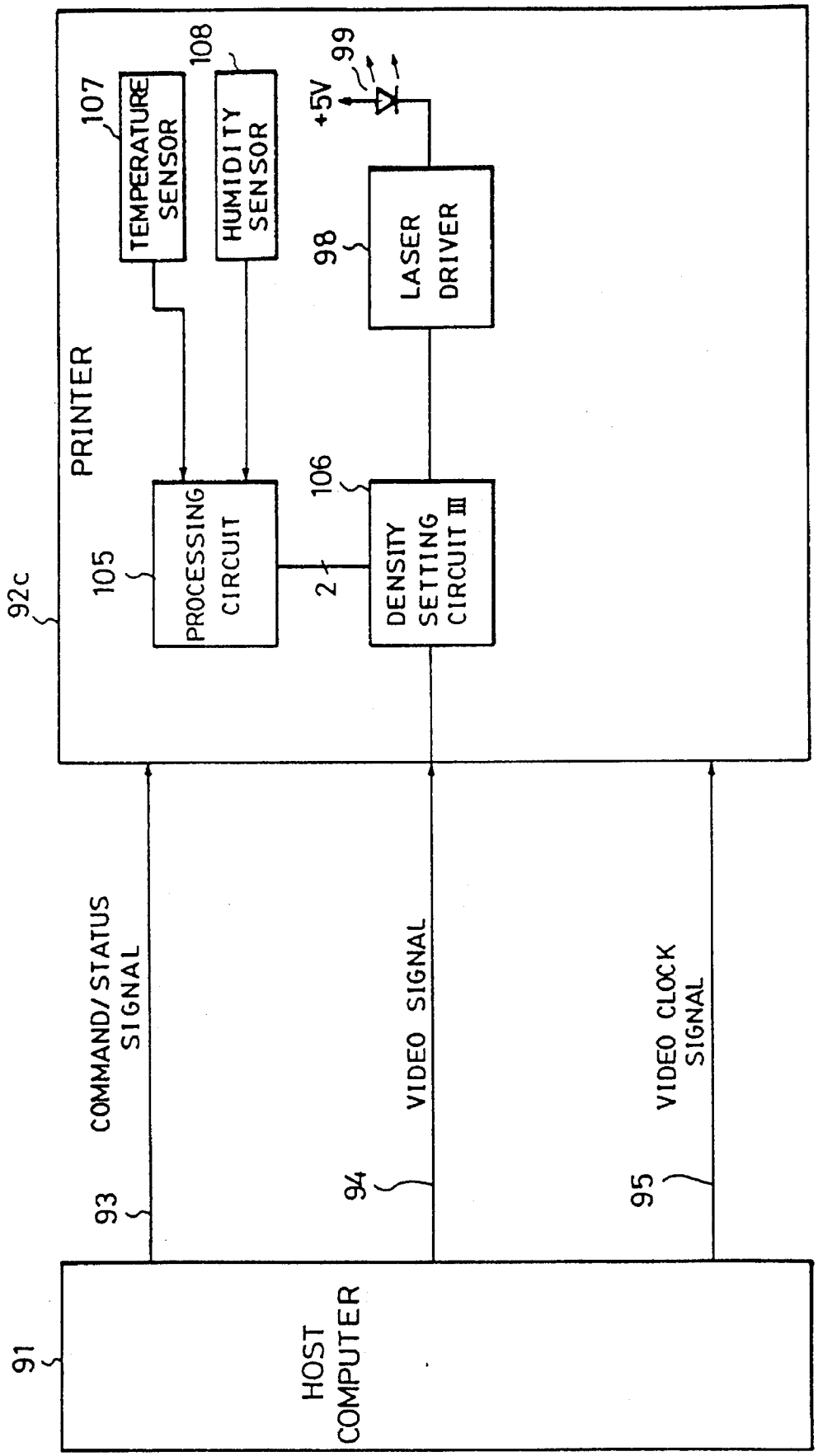
FIG. 27 is a block diagram showing an arrangement of an image forming apparatus according to a ninth embodiment.

FIG. 27 is block diagram showing an arrangement of an image forming apparatus according to the ninth embodiment.

The printer 92c shown in FIG. 27 includes a temperature sensor 107 for detecting the temperature in the printer, and a humidity sensor 108 for detecting the humidity in the printer. The temperature sensor 107, and the humidity sensor 108 convert the detected temperature, and the detected humidity into electrical signals, respectively. The electrical signals are input to a processing circuit 105 by which a 2 bit density designation signal are sent to a density setting circuit III (106) in order to set a printing density. The structure of the density setting circuit III (106) can be the same as the one of the density setting circuit II (102) shown in FIG. 25 so that the detailed explanations are omitted.

The processing circuit 105 is structured with a CPU (not shown). Analog voltages output from the temperature sensor 107 and the humidity sensor are input to A/D ports of the CPU so that the analog voltages are converted into coded values in the CPU. The CPU calculates the most suitable 2 bit density designation signal based on the coded values of the temperature and the humidity.

Figure 34:
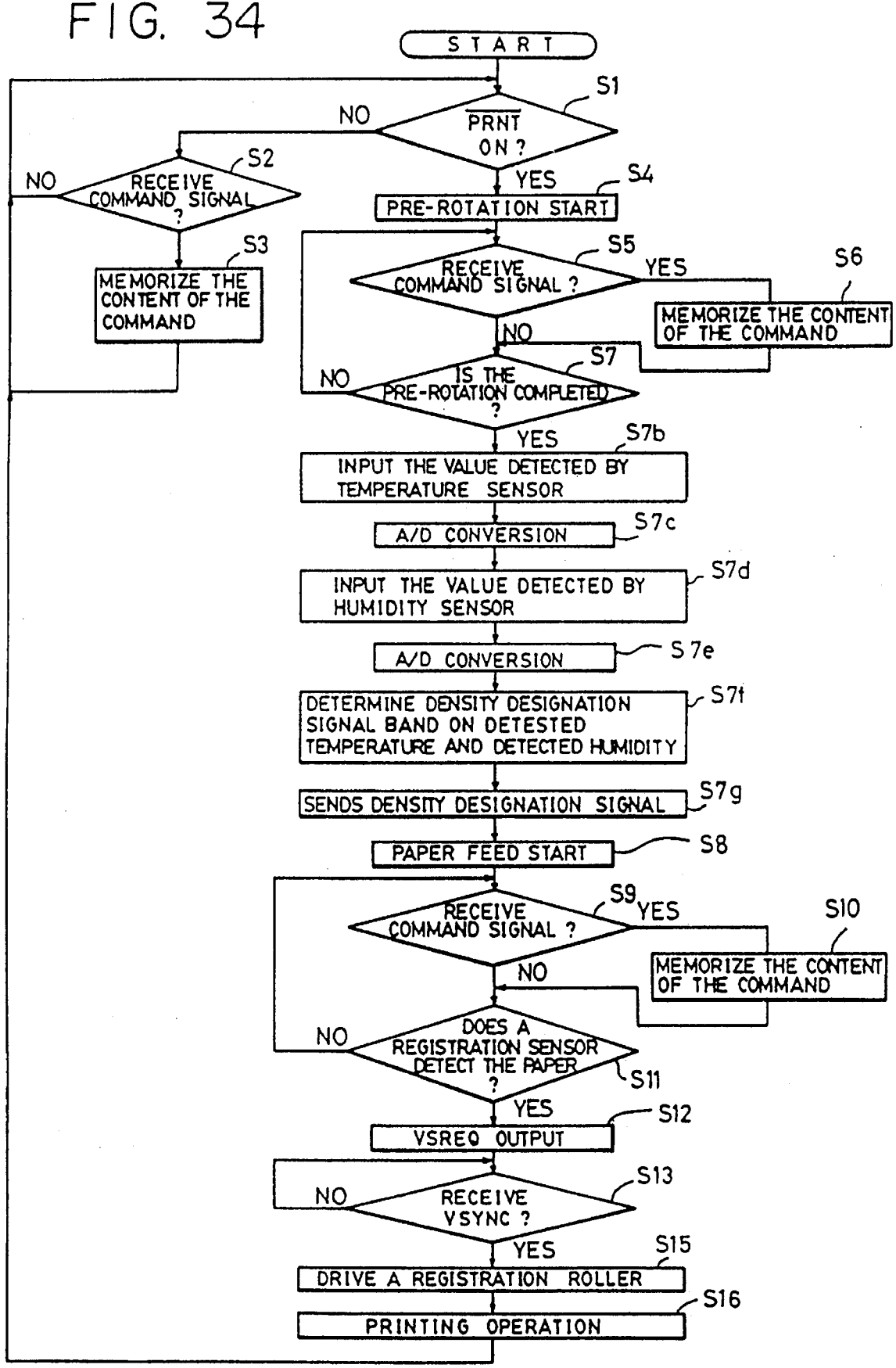
FIG. 34 is a flow chart showing a control operation by a CPU according to the ninth embodiment.

FIG. 34 is a flow chart showing a control operation by the CPU.

In FIG. 34, the same reference numerals are used to denote the corresponding steps shown in FIG. 31. That is, step S1 to step S13, step S15, and step S16 can be the same as the steps shown in FIG. 31 except that a command signal is not limited to the density command signal described in the eighth embodiment. Thereby, the detailed explanations about these steps are omitted.

In steps, S7b, S7c, the CPU inputs the analog voltage output from the temperature sensor 107, and the input analog voltage is converted into a digital value (coded value).

In steps S7d, S7e, the CPU inputs the analog voltage output from the humidity sensor 108, and the input analog voltage is converted into a digital value (coded value).

Then, in step S7f, the CPU determines the 2 bit density designation signal based on these digital values, and the flow advances to step S7g. In step S7g, the CPU sends the 2 bit density designation signal to the density setting circuit III (106).

According to the above-described structure, it is possible to correct the change of the printing density caused by the temperature or the humidity in the printer.

EMBODIMENT 10

Figure 28:
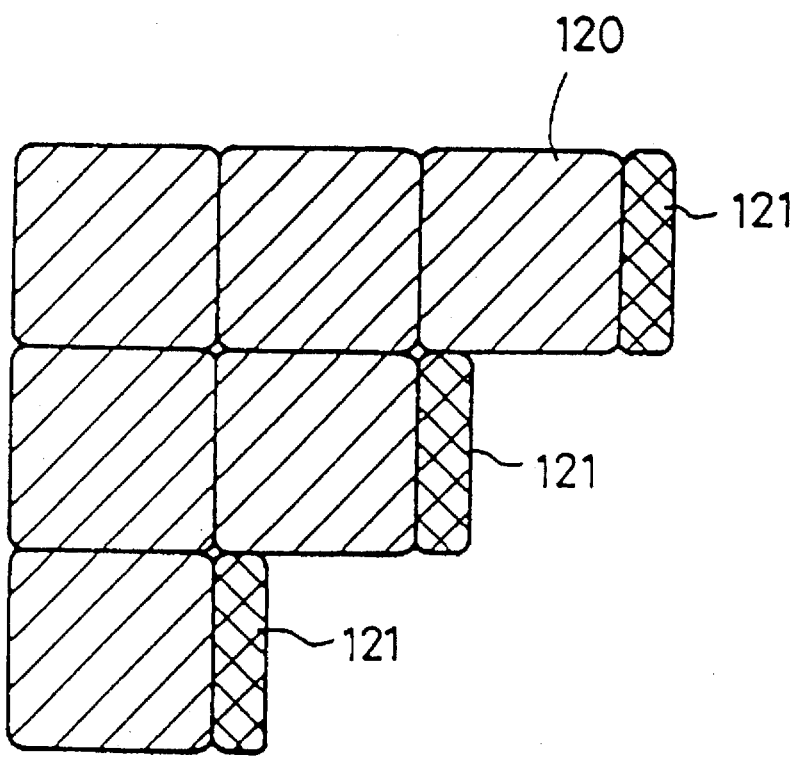
FIG. 28 is an illustration showing an output example according to a tenth embodiment.
Figure 29:
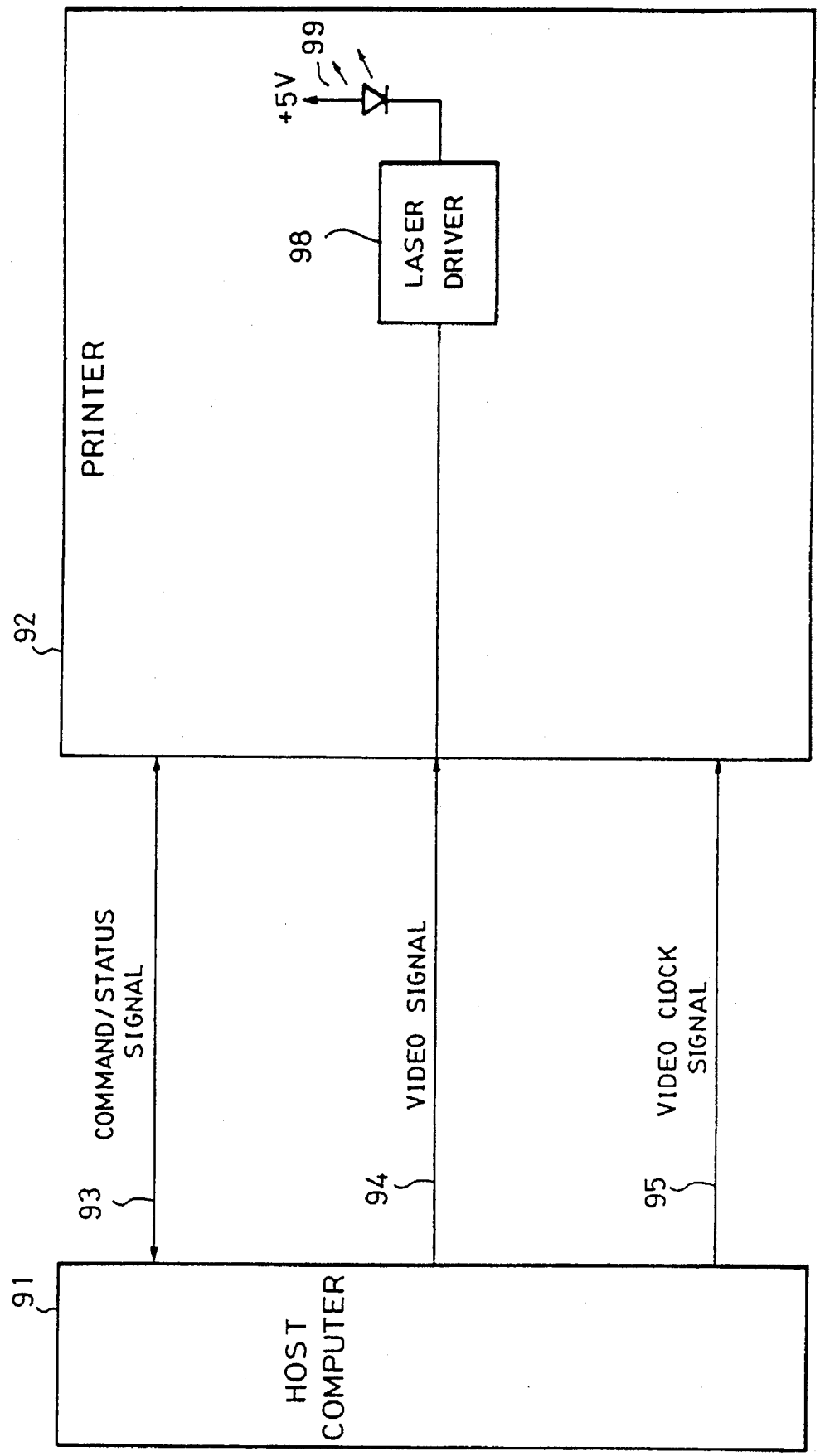
FIG. 29 is a block diagram showing an arrangement of a known image forming apparatus.
Figure 30:
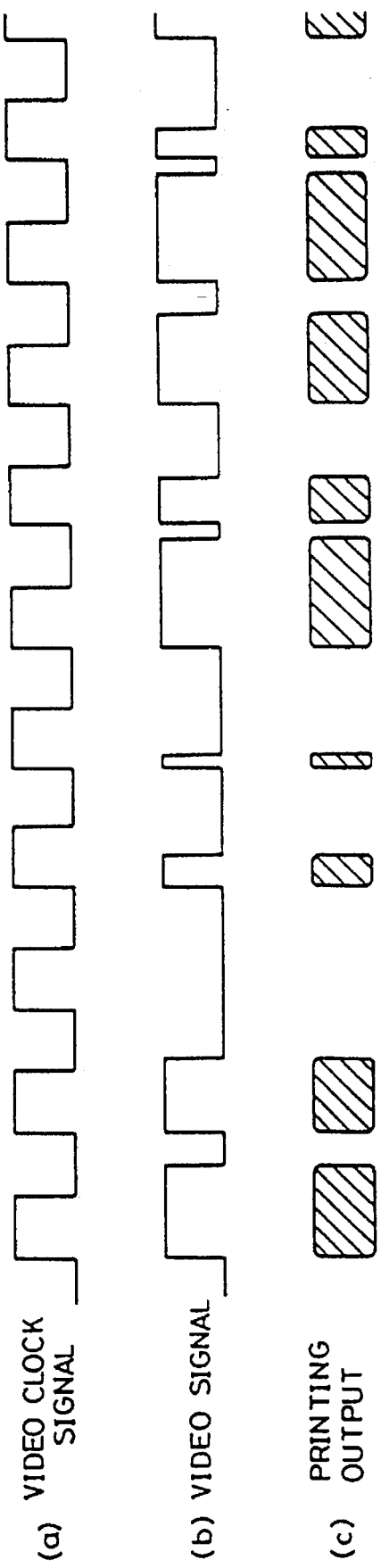
FIG. 30 is a timing chart for signals produced in a known image forming apparatus.

FIG. 28 is an illustration showing an output example by a binary printer, which has the same structure with the printers 92a to 92c, and prints a character.

As shown in FIG. 28, slanting lines portions 120 are processed for smoothing, thereby smoothing dots 121, each of which is a small fraction of a one dot, are added to the slanting lines portions 120. It is possible to input a signal 94 for the smoothing dot 121 as the pulse-width-modulated video signal sent from the host computer like embodiments 7 to 9.

In the above-described embodiments, the host computer performs the pulse-width-modulation to the image data, and transmits the pulse-width-modulated video signal to the printer. However, it is also possible to provide a pulse-width-modulation unit between the host computer and the printer. The pulse-width-modulation unit is structured in such a way that it performs the pulse-width-modulation to a multi-level image signal sent from the host computer, and transmits the pulse-width-modulated video signal to the printer.

According to the present invention, the density correction can be performed with a simple structure by changing the pulse-width of the pulse-width-modulated image signal in the printer side.

Although particular embodiments of the present invention are herein disclosed for purposes of explanation, various modifications thereof, after study of this specification, will be apparent to those skilled in the art to which the invention pertains.

What is claimed is:

1. An image forming apparatus comprising:

image forming means for forming an image on an image bearing member;

reproduction means for reproducing a high density image and a halftone image on the image bearing member;

detecting means for detecting the density of the high density image and the halftone image formed on the image bearing member;

control means for controlling an image forming condition of said image forming means based on a detection result by said detecting means; and input means for inputting an image signal, wherein said image forming means includes beam generating means for generating a beam in accordance with the image signal input from said input means, and developing means for developing the image formed on the image bearing member, and wherein said control means controls at least one of the developing bias of said developing means and the drive current of said beam generating means for controlling the image forming condition.

2. An image forming apparatus comprising:

image forming means for forming an image on an image bearing member;

pattern generation means for generating a predetermined patter, wherein said image forming means forms a halftone image based on the predetermined pattern generated by said pattern generation means;

detection means for detecting the density of the halftone image; and adjusting means for adjusting the image forming means based on a detection result by said detecting means, wherein said image forming means forms a solid image based on the predetermined pattern generated by said pattern generation means, and wherein said detecting means detects the density of the solid image, and said adjusting means adjusts the image forming means based on the density of the halftone image and the solid image detected by said detecting means.

3. An image forming apparatus according to claim 2, wherein said image forming means further comprises a charger for charging the image bearing member, developing means for developing the image formed on the image bearing member, a beam generating means for generating a beam, wherein said adjusting means adjusts at least one of the output of said charger, the developing bias of said developing means and the light quantity of the beam generating means.

4. An image forming apparatus according to claim 3, wherein said image forming means further comprises input means for inputting image data, and converting means for converting the image data input from said input means and outputting converted image data, wherein said adjusting means adjusts a conversion mode of said converting means.

5. An electrophotographic image forming apparatus, comprising:

converting means for converting an input image data;

image forming means for forming an image by an electrophotographic method on the basis of converted image data from said converting means;

generating means for generating a first predetermined signal for causing said image forming means to form a high density image, and for generating a second predetermined signal for causing said image forming means to form a halftone image;

detecting means for detecting a density of at least the high density image and the halftone image;

control means for controlling a condition of an electrophotographic image formation by said image forming means, in accordance with the density of the high density image detected by said detecting means; and correcting means for correcting a conversion characteristic of said converting means in accordance the density of the halftone image detected by said detecting means, wherein said apparatus causes said image forming means to form the halftone image in response to the second predetermined signal and under the condition controlled by said control means in accordance with the density detected for the high density image.

6. An electrophotographic image forming apparatus according to claim 5, wherein said image forming means comprises charging means for uniformly charging an image bearing member, emitting means for emitting a light modulated in accordance with the image data converted by said converting means and for forming a latent image on the image bearing member uniformly charged by said charging means, developing and means for developing the latent image formed on the image bearing member.

7. An electrophotographic image forming apparatus according to claim 6, wherein said control means controls a light intensity of said emitting means in accordance with the detection result of the high density image by said detecting means.

8. An electrophotographic image forming apparatus according to claim 6, wherein said control means controls a voltage to be applied to said charging means in accordance with the detection result of the high density image by said detecting means.

9. An electrophotographic image forming means according to claim 6, wherein said control means controls a developing bias of said developing means in accordance with the detection result of the high density image by said detecting means.

10. An electrophotographic image forming apparatus according to claim 6, wherein said detecting means detects a density of the image formed on the image bearing member.

11. An electrophotographic image forming apparatus according to claim 6, further comprising transfer means for transferring the developed latent image on the image bearing member onto a transfer material, wherein said detecting means detects the density of the image transferred on the transfer material by said transfer means.

12. An electrophotographic image forming apparatus according to claim 5, 6, 7, 8, 9, 10, or 11, further comprising binarizing means for binarizing the image data converted by said converting means.

13. An electrophotographic image forming apparatus according to claim 12, wherein said binarizing means comprises means for processing the image data, converted by said converting means, by a dither method.

14. An electrophotographic image forming apparatus according to claim 12, wherein said binarizing means comprises pulse-width modulation means for outputting a pulse signal having a width in accordance with the image data converted by said converting means.

15. A control method for an apparatus having image forming means for forming an image by electrophotographic method, comprising:

a first generating step of generating a first predetermined signal, and forming with said image forming means a high density image in response to the first predetermined signal;

a first detecting step of detecting a density of the high density image formed by said image forming means;

a control step of controlling a condition of an electrophotographic image formation by said image forming means in accordance with the density of the high density image detected in said first detecting step;

a second generating step of generating a second predetermined signal under the condition controlled in said controlling step, and forming with said image forming means a halftone image in response to the second predetermined signal;

a second detecting step of detecting a density of the halftone image formed by said image forming means; and a correcting step of correcting a conversion characteristic of converting means for converting an input image data in accordance with the density of the halftone image detected in said second detecting step.

16. A control method according to claim 15, wherein said image forming means comprises charging means for uniformly charging an image bearing member, emitting means for emitting a light modulated in accordance with the image data converted by said converting means and for forming a latent image on the image bearing member uniformly charged by said charging means, and developing means for developing the latent image formed on the image bearing member.

17. A control method according to claim 16, wherein in said control step, a light intensity of said emitting means is controlled in accordance with the density detected in said first detecting step of the high density image.

18. A control method according to claim 16, wherein in said control step, a voltage to be applied to said charging means is controlled in accordance with the density detected in said first detecting step of the high density image.

19. A control method according to claim 16, wherein in said control step, a developing bias of said developing means is controlled in accordance with the density detected in said first detecting step of the high density image.

20. A control method according to claim 16, wherein in said first and second detecting steps, a density of the image formed on the image bearing member is detected.

21. A control method according to claim 16, wherein said image forming means further comprises transfer means for transferring the image formed on the image bearing member onto a transfer material, wherein in said first and second detecting steps, the density of the image transferred on the transfer material by said transfer means is detected.

22. A control method according to claim 15, wherein said apparatus further comprises binarizing means for binarizing the image data converted by said converting means.

23. A control method according to claim 22 wherein said binarizing means comprises means for processing the image data, converted by said converting means, by a dither method.

24. A control method according to claim 22, wherein said binarizing means comprises pulse-width modulation means for outputting a pulse signal having a width in accordance with the image data converted by said converting means.

* * * * *

UNITED STATES PATENT AND TRADEMARK OFFICE
CERTIFICATE OF CORRECTION

PATENT NO. : 5,565,995

DATED : October 15, 1996

INVENTOR(S): Hiromichi Yamada, et al.

Page 1 of 3

It is certified that error appears in the above-identified patent and that said Letters Patent is hereby corrected as shown below:

```
        Column 1, line 64, change "such" to --such a--.

Column 2, line 14, change "based" to --based on--;
                  line 16, change "producing" to
--producing a--; and
                  line 19, change "are" to --is--.

Column 6, line 39, change "FIG..2A solid line," to
--FIG. 2A (solid line),--;
                  line 44, change "solid line," to
--(solid line),--; and
                  line 49, change "coincide" to
--coincides--.

Column 8, line 45, change "line." to --like.--.

Column 9, line 29, change "is" to --are--; and
                  line 35, change "is" to --are--.

Column 10, line 7, delete "to".

Column 11, line 56, change "use" to --be used--.
```

UNITED STATES PATENT AND TRADEMARK OFFICE
CERTIFICATE OF CORRECTION

PATENT NO. : 5,565,995

DATED : October 15, 1996

INVENTOR(S): Hiromichi Yamada, et al.

It is certified that error appears in the above-identified patent and that said Letters Patent is hereby corrected as shown below:

Column 13, line 29, change "$\gamma_1$," to --$\gamma_a$,--;
line 34, change "are" to --is--; and
line 46, change "step-wedge" to --step-wise--.

Column 14, line 4, change "using" to --useable--;
line 26, change "laster" to --laser--;
line 44, change "62." to --61.--;
line 46, change "it's" to --its--; and
line 66, change "methods," to --method and--.

Column 15, line 32, delete the last occurrence of "the";
line 42, change "ici" to --ic1--; and
line 44, change "circuits" to --circuit--.

Column 16, line 59, change "of" to --of an--.

Column 17, line 10, change "PRNT" to --$\overline{\text{PRNT}}$--;
line 19, change "control" to --control as--;
line 25, change "synchronization'signal" to --synchronization signal--;
line 40, change "of" to --of an--; and
line 60, change "are" to --is--.

UNITED STATES PATENT AND TRADEMARK OFFICE
CERTIFICATE OF CORRECTION

PATENT NO. : 5,565,995

DATED : October 15, 1996

INVENTOR(S) : Hiromichi Yamada, et al.

Page 3 of 3

It is certified that error appears in the above-identified patent and that said Letters Patent is hereby corrected as shown below:

```
        Column 18, line 40, change "dot" to --dots--.

Column 19, line 21, change "patter," to
--pattern--.

Column 20, line 4, change "the" to --with the--;
                  line 17, change "developing and" to
--and developing--; and
                  line 29, change "means" to
--apparatus--.
```

Signed and Sealed this

Twentieth Day of May, 1997

*Attest:*

BRUCE LEHMAN

*Attesting Officer*   Commissioner of Patents and Trademarks